(12) United States Patent
Hasegawa

(10) Patent No.: US 7,894,110 B2
(45) Date of Patent: Feb. 22, 2011

(54) PIXEL INTERPOLATION METHOD AND IMAGE DISTINCTION METHOD

(75) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1197 days.

(21) Appl. No.: 11/288,118

(22) Filed: Nov. 29, 2005

(65) Prior Publication Data

US 2006/0114526 A1 Jun. 1, 2006

(30) Foreign Application Priority Data

Dec. 1, 2004 (JP) ............................. 2004-348118
Sep. 26, 2005 (JP) ............................. 2005-277718

(51) Int. Cl.
G03F 3/08 (2006.01)
H04N 1/46 (2006.01)
G06K 15/00 (2006.01)

(52) U.S. Cl. ...................... 358/518; 358/1.18; 358/525

(58) Field of Classification Search .................. 358/1.9, 358/518, 520, 525, 3.26, 1.18; 382/162, 382/167, 278, 300
See application file for complete search history.

(56) References Cited

U.S. PATENT DOCUMENTS

| 5,652,621 | A | * | 7/1997 | Adams et al. | ............... | 348/272 |
| 6,487,309 | B1 | * | 11/2002 | Chen | ......................... | 382/162 |
| 6,853,748 | B2 | * | 2/2005 | Endo et al. | .................. | 382/167 |
| 6,897,897 | B2 | * | 5/2005 | Mise et al. | ................... | 348/252 |
| 6,930,711 | B2 | | 8/2005 | Fukui et al. | | |
| 7,253,845 | B2 | * | 8/2007 | Rumreich et al. | ............ | 348/649 |
| 2001/0005429 | A1 | * | 6/2001 | Ishiga et al. | ................. | 382/167 |
| 2002/0041332 | A1 | * | 4/2002 | Murata et al. | ............... | 348/272 |
| 2002/0076121 | A1 | * | 6/2002 | Shimizu et al. | ............. | 382/300 |

FOREIGN PATENT DOCUMENTS

JP 2001-245311 9/2001
JP 2001-292454 10/2001

(Continued)

OTHER PUBLICATIONS

U.S. Appl. No. 11/577,453, filed Apr. 18, 2007, Hasegawa et al.
U.S. Appl. No. 11/275,009, filed Dec. 1, 2005, Hasegawa.
U.S. Appl. No. 12/269,354, filed Nov. 12, 2008, Hasegawa.

(Continued)

*Primary Examiner*—James A Thompson
(74) *Attorney, Agent, or Firm*—Oblon, Spivak, McClelland, Maier & Neustadt, L.L.P.

(57) ABSTRACT

An image processing circuit inputs pixels arranged in RGB Bayer pattern. A chroma value calculation circuit calculates a chroma coefficient for evaluating chroma of a peripheral region of a target pixel. A correlation value calculation circuit calculates a correlation value for gray image and a correlation value for color image. When the chroma coefficient is higher than a first threshold value, a correlation judging method for color image and a pixel interpolation method for color image are selected. When the chroma coefficient is not higher than the first threshold value and higher than a second threshold value, a correlation judging method for gray image and the pixel interpolation method for color image are selected. When the chroma coefficient is not higher than the second threshold value, the correlation judging method for gray image and a pixel interpolation method for gray image are selected. Interpolation is executed in a pixel interpolation circuit.

17 Claims, 15 Drawing Sheets

FOREIGN PATENT DOCUMENTS

| | | |
|---|---|---|
| JP | 2001-339735 | 12/2001 |
| JP | 2002-010279 | 1/2002 |
| JP | 2002-300590 | 10/2002 |
| JP | 2004-007167 | 1/2004 |

OTHER PUBLICATIONS

Office Action issued Nov. 2, 2010 in Japanese Patent Application No. 2005-277718, filed Sep. 26, 2005 (with partial English-language Translation).

* cited by examiner

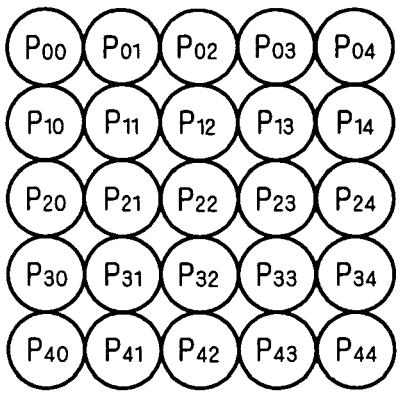
F I G. 2 A
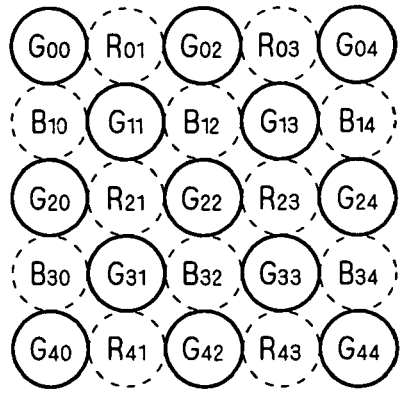
F I G. 2 B
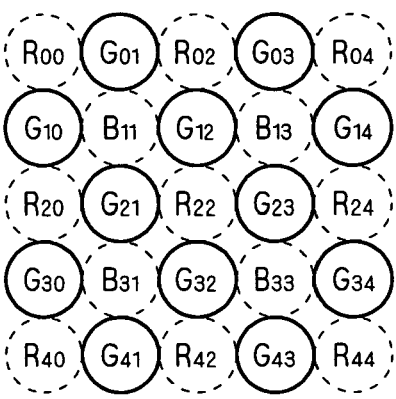
F I G. 2 C
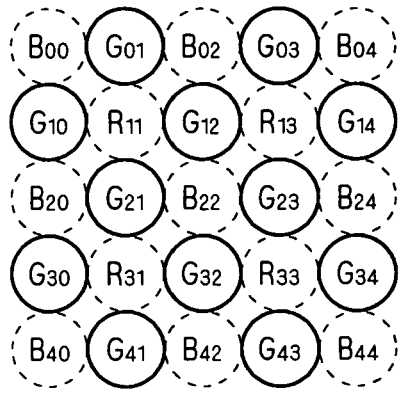
F I G. 2 D
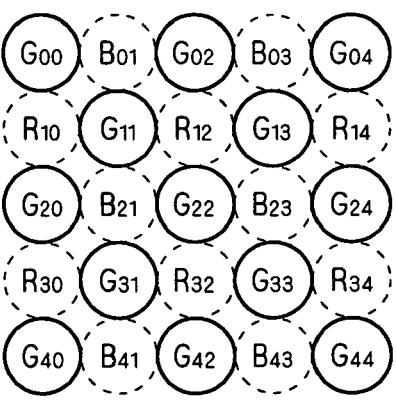
F I G. 2 E

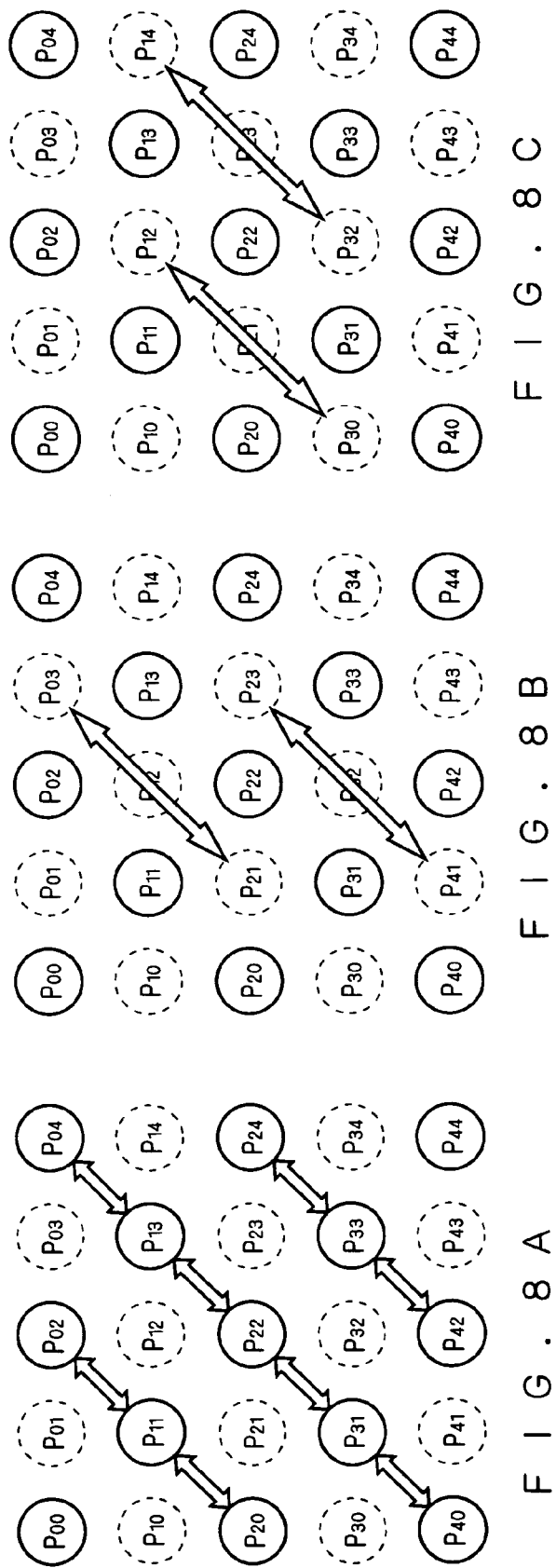

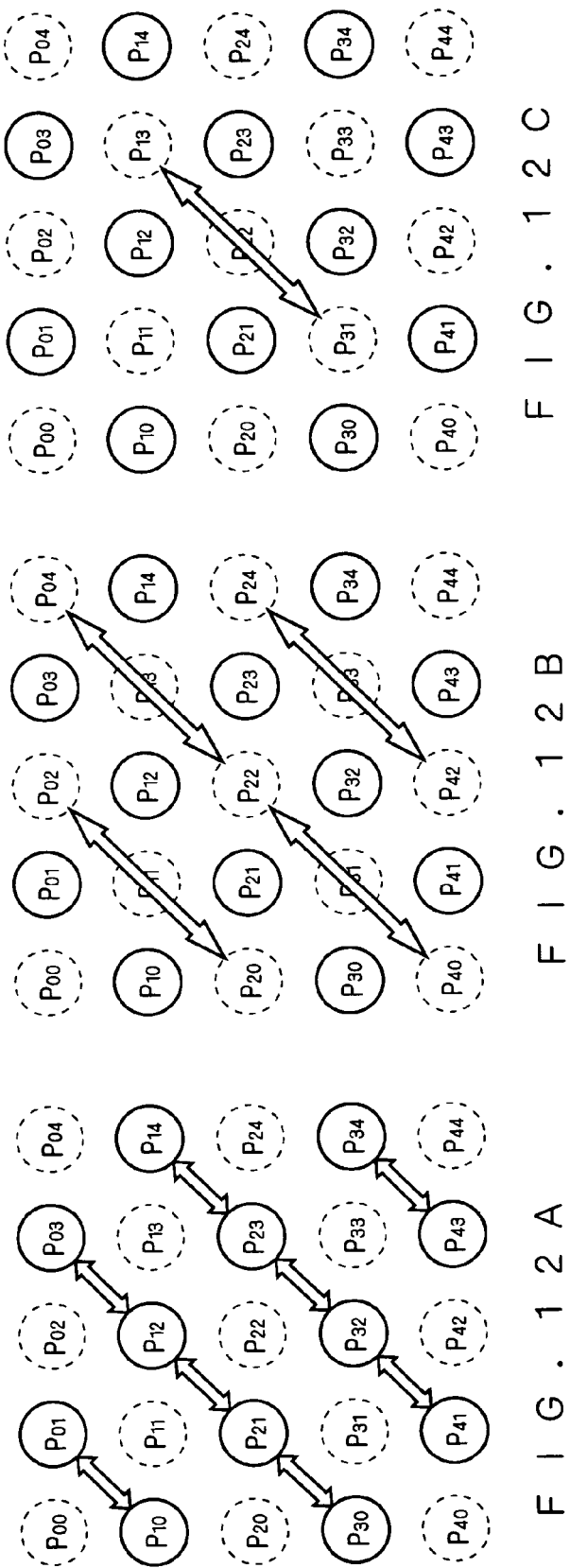

35

PIXEL INTERPOLATION METHOD AND IMAGE DISTINCTION METHOD

BACKGROUND OF THE INVENTION

1. Field of the Invention

The present invention relates to a pixel interpolation technique adopted in an image processing circuit provided for a digital camera or the like.

2. Description of the Background Art

An imaging device such as CCD or CMOS used in a digital camera or the like photoelectrically transfers light received through a color filter to output a pixel signal. Such color filter includes an RGB color filter, a YMCK color filter and the like. A single-chip imaging device outputs a single-color pixel signal per pixel. For instance, when employing the RGB color filter, a pixel signal having one of R (red), G (green) and B (blue) color components is output per pixel.

Therefore, a pixel signal output from a single-chip color imaging device needs to be interpolated with pixel signals of other color components. Various algorithms are used in such interpolation. An exemplary method is to calculate a correlation in the horizontal direction and a correlation in the vertical direction to execute pixel interpolation using pixels present in either direction having a higher correlation. An alternative method is to execute pixel interpolation after assigning weights according to the distance between a target pixel and its neighboring pixels.

Japanese Patent Application Laid-Open No. 2001-292454 describes judging whether a pixel is in a gray edge or a color edge and determining a weighting coefficient by pixel interpolation based on the result of judgment to reduce color aliasing. Japanese Patent Application Laid-Open No. 2002-300590 describes generating color-difference signals by two methods after execution of pixel interpolation, and selecting either of the color-difference signals based on a chroma value to reduce color aliasing resulting from the pixel interpolation.

However, a conventional interpolation method causes in some cases degradation in picture quality due to misinterpolation in a gray image containing high-frequency components such as thin lines in the horizontal or vertical direction. Particularly, an image positioned on the boundary between a gray image and a color image is degraded in picture quality.

SUMMARY OF THE INVENTION

An object of the present invention is to provide an image processing method capable of reducing color aliasing and achieving improved resolution for generating a high-quality sharp image.

According to a first aspect of the invention, a pixel interpolation method includes the steps a) to d). The step a) is to input a pixel signal of a predetermined color space. The step b) is to calculate a chroma evaluation value of a region formed by a target pixel and neighboring pixels thereof. The step c) is to select a correlation judging method and a pixel interpolation method on the basis of the chroma evaluation value. The step d) is to execute pixel interpolation on the target pixel by the selected pixel interpolation method in a correlated direction determined by the selected correlation judging method.

According to a second aspect of the invention, a pixel interpolation method includes the steps a) to e). The step a) is to input a pixel signal of a predetermined color space. The step b) is to calculate a chroma evaluation value of a region formed by a target pixel and neighboring pixels thereof. The step c) is to execute pixel interpolation for color image on the target pixel using a pixel interpolation method for color image. The step d) is to execute pixel interpolation for gray image on the target pixel using a pixel interpolation method for gray image. The step e) is to synthesize a pixel value obtained by execution of the pixel interpolation for color image and a pixel value obtained by execution of the pixel interpolation for gray image in a proportion positively correlated with the chroma evaluation value.

According to a third aspect of the invention, an image distinction method includes the steps a) to e). The step a) is to input a pixel signal of a predetermined color space. The step b) is to calculate a first color-difference component value from color-difference component values obtained on the basis of each pixel average value per color component using a target pixel and neighboring pixels thereof. The step c) is to accumulate color-difference component values in a predetermined direction using the target pixel and the neighboring pixels thereof to calculate a second color-difference component evaluation value. The step d) is to compare the first and second color-difference component evaluation values to select one having a lower color-difference component level, as a chroma value. The step e) is to judge whether a region including the target pixel is one of a gray image and a color image using the chroma evaluation value.

A chroma evaluation value of a peripheral region of a target pixel is calculated, and a correlation judging method and a pixel interpolation method are selected or synthesized on the basis of the chroma evaluation value. Accordingly, it is possible to avoid misjudgment of a correlated direction and misinterpolation, which allows color aliasing in pixel interpolation to be reduced.

Distinction between a gray image and a color image is made on the basis of the chroma evaluation value to determine a suitable region in judging a correlated direction and determine a suitable region in selecting a pixel interpolation method, which improves the accuracy of pixel interpolation.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A through 2E each illustrate pixel arrangement of RGB Bayer pattern;

FIGS. 8A to 8C each illustrate a method of calculating a correlation value in another diagonal direction in a color region when a target pixel is a G pixel;

FIGS. 12A to 12C each illustrate a method of calculating a correlation value in another diagonal direction in a color region when the target pixel is an R or a B pixel;

DESCRIPTION OF THE PREFERRED EMBODIMENTS

Preferred embodiments of the present invention will be described below with reference to the accompanied drawings.

First Preferred Embodiment

1. General Overall Construction of Digital Camera

Figure 1:
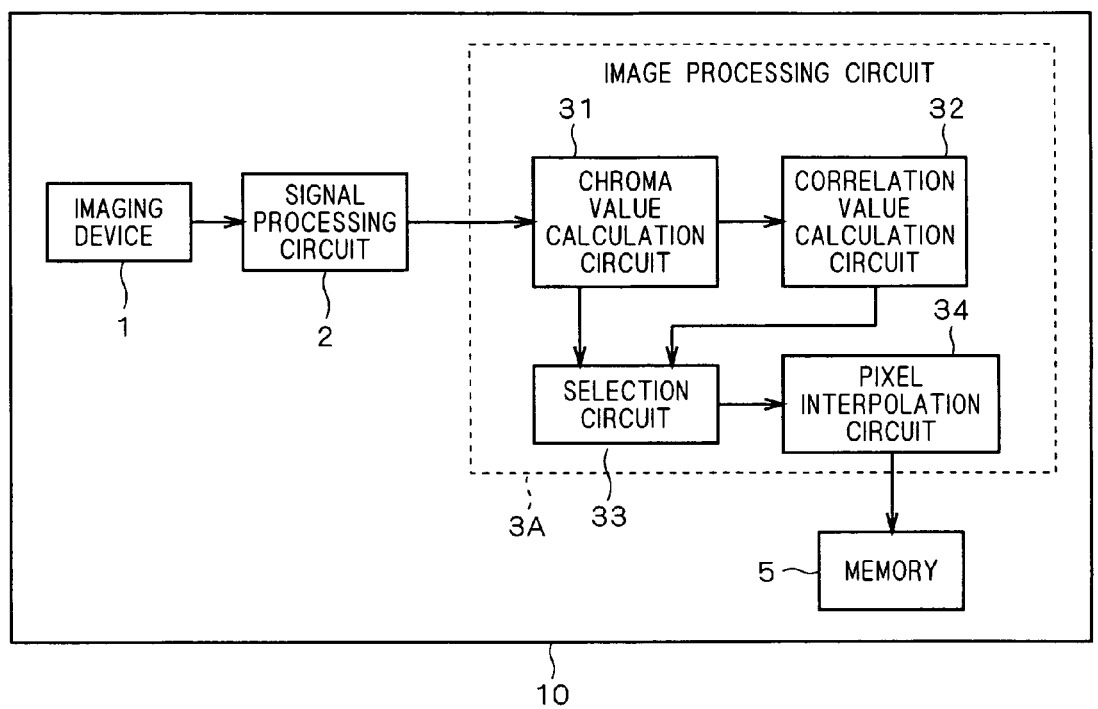
FIG. 1 is a block diagram illustrating a digital camera according to a first preferred embodiment of the present invention.

FIG. 1 is a block diagram illustrating a digital camera 10 according to a first preferred embodiment of the present invention. The digital camera 10 includes an imaging device 1, a signal processing circuit 2, an image processing circuit 3A and a memory 5. The imaging device 1 is a single-chip CCD having a color filter array of RGB Bayer pattern, and outputs a pixel signal of one of RGB color components per pixel. More specifically, assuming that a G signal and an R signal are output alternately like GRGR in an odd-numbered horizontal line, a B signal and a G signal are output alternately like BGBG in an even-numbered horizontal line. A CMOS sensor may be used as the imaging device 1.

A pixel signal output from the imaging device 1 is input to the signal processing circuit 2. The signal processing circuit 2 executes signal processing such as white balance and black level correction on the pixel signal. The pixel signal output from the signal processing circuit 2 is input to the image processing circuit 3A. The image processing circuit 3A has a chroma value calculation circuit 31, a correlation value calculation circuit 32, a selection circuit 33 and a pixel interpolation circuit 34.

Using pixel signals of a target pixel and its neighboring pixels, the chroma value calculation circuit 31 calculates a chroma value of that region. This chroma value is used as an index for judging whether the region represents a gray image or a color image. Using pixel signals of the target pixel and its neighboring pixels, the correlation value calculation circuit 32 calculates a correlation value of that region. The selection circuit 33 selects the most suitable correlation judging method and pixel interpolation method on the basis of the chroma value calculated by the chroma value calculation circuit 31. The pixel interpolation circuit 34 executes pixel interpolation using pixel signals of the target pixel and its neighboring pixels. More specifically, a correlated direction is determined by the correlation judging method selected by the selection circuit 33, and pixel interpolation in the determined correlated direction is executed by the pixel interpolation method selected by the selection circuit 33.

To perform a computation using pixel signals of the target pixel and its neighboring pixels, the chroma value calculation circuit 31, correlation value calculation circuit 32 and pixel interpolation circuit 34 are each provided with a register group for accumulating pixel signals of an M×N matrix region. The circuits 31, 32 and 33 may be configured to share registers among each other.

After execution of pixel interpolation in the image processing circuit 3A, a signal having all of RGB color components is output per pixel. Pixel signals are then stored in the memory 5. The pixel signals stored in the memory 5 are further subjected to compression to be stored in a recording medium not shown, as image data. Alternatively, the pixel signals are used as data to be displayed on a monitor not shown but equipped with the digital camera 10.

2. Method of Depicting Pixels in Bayer Pattern

Next, a method of depicting pixels in a Bayer pattern will be described. First, pixels of a 5×5 matrix region are depicted as shown in FIG. 2A. The character P in FIG. 2A is used without considering which one of R, G and B color components each pixel represents. In contrast, FIGS. 2B to 2E each illustrate pixels distinguishing their color components from one another. The character R represents a red pixel, G represents a green pixel and B represents a blue pixel. In FIGS. 2A through 2E and FIGS. 5A, 5B through FIG. 16, G pixels are circled by solid lines, and R and B pixels are circled by broken lines.

As to numerical subscripts with the respective characters P, R, G and B, the first digit denotes the row number of a pixel in a matrix region, and the second digit denotes the column number of a pixel in the matrix region. FIGS. 2A through 2E each illustrate pixel arrangement of a matrix region formed by 25 pixels $P_{00}$ to $P_{44}$ including a target pixel $P_{22}$. Other drawings also depict pixels in a similar manner. The characters P, R, G and B may each indicate a pixel value in the present and following preferred embodiments and numerical expressions. For instance, the character $P_{11}$ indicates a pixel itself located in the first column and first row as well as a pixel value of the pixel located in the first column and first row.

FIGS. 2B and 2E both illustrate pixel arrangement when the target pixel $P_{22}$ is a G pixel. FIG. 2C illustrates pixel arrangement when the target pixel $P_{22}$ is an R pixel. FIG. 2D illustrates pixel arrangement when the target pixel $P_{22}$ is a B pixel. As described above, the chroma value calculation circuit 31, correlation value calculation circuit 32 and pixel interpolation circuit 34 each accumulate pixel signals of a matrix region in a register group in order to execute computations using pixel signals of the target pixel and its neighboring pixels. When pixels in a 5×5 matrix region are to be processed, there are four patterns of pixel signals stored in the register group as shown in FIGS. 2B to 2E. When pixels in a 3×3 matrix region are to be processed, nine pixels $P_{11}$, $P_{12}$, $P_{13}$, $P_{21}$, $P_{22}$, $P_{23}$, $P_{31}$, $P_{32}$ and $P_{33}$ centered around the target pixel $P_{22}$ are used, and patterns of pixel signals are also those four shown in FIGS. 2B to 2E.

3. Chroma Value Calculation

Next, chroma value calculation executed by the chroma value calculation circuit 31 will be described in detail. The chroma value calculation circuit 31 analyzes color-difference components in a matrix region (formed by the target pixel and its neighboring pixels) to obtain a chroma evaluation value of this region. This chroma evaluation value is used for judging whether a to-be-processed region represents a high-chroma image (hereinafter referred to as a "color image") or a low-chroma image (hereinafter referred to as a "gray image") in a selection step which is a post process.

The chroma evaluation value is calculated on the basis of a color-difference component between a G pixel level and an R pixel level and a color-difference component between a G pixel level and a B pixel level in the matrix region including the target pixel. Then, in the present embodiment, two color-difference component values are calculated to determine the chroma evaluation value. More specifically, the chroma value calculation circuit 31 calculates "a first color-difference component evaluation value" and "a second color-difference component evaluation value". The "first color-difference component value" is obtained from color-difference component values calculated on the basis of each pixel average value per color component of pixels present in the matrix region without taking into account the position of the respective pixels in the matrix region. The "second color-difference component evaluation value" is obtained by accumulating color-difference component values in a particular direction taking into account the position of the respective pixels present in the matrix region.

The reason for calculating two color-difference component evaluation values as described above is as follows: in the case of employing the "first color-difference component evaluation value" as a chroma value, a gray image containing thin lines in the horizontal or vertical direction such as a RETMA chart may be misidentified as a color image. This is because, even though there is a strong correlation in the horizontal or vertical direction, a color-difference component value is calculated using pixel average values in the region without taking into account the correlation. Accordingly, in the present embodiment, two color-difference component evaluation values are calculated as will be described below, and either value that is lower in color-difference component level is employed as a chroma evaluation value.

3-1. First Color-Difference Component Evaluation Value

First, a method of calculating the first color-difference component evaluation value will be described. The first color-difference component evaluation value is suitable for evaluation of a color-difference component of a flat area (low-frequency region) such as blue sky or a wall having no pattern thereon. In this context, the flat area indicates a region having no strong correlation in any particular direction. To obtain the first color-difference component evaluation value, average values $R_{AVE}$, $G_{AVE}$ and $B_{AVE}$ of pixel values of respective RGB colors among pixels included in a 3×3 matrix region centered on the target pixel are calculated first. The average values $R_{AVE}$, $G_{AVE}$ and $B_{AVE}$ are generally expressed by the following equations (1). In the equations (1), the numbers of R, G and B pixels present in the matrix region are represented by $N_R$, $N_G$ and $N_B$, respectively, and the term of $\Sigma$ indicates a cumulative pixel value of each color component $$\begin{cases} R_{ave} = \dfrac{1}{N_R} \sum_{i}^{N_R} R_i \\ G_{ave} = \dfrac{1}{N_G} \sum_{i}^{N_G} G_i \\ B_{ave} = \dfrac{1}{N_B} \sum_{i}^{N_B} B_i \end{cases} \quad (1)$$

There are four patterns of pixel arrangement as shown in FIGS. 2B through 2E, and the method of calculating average values differs among the four patterns. First, the average values $R_{AVE}$, $G_{AVE}$ and $B_{AVE}$ are calculated by the expressions (2) when the target pixel is a G pixel and the pixel arrangement is that of FIG. 2B.

$$G_{ave} = \frac{G_{11} + G_{13} + G_{22} + G_{31} + G_{33}}{5} \quad (2)$$

$$R_{ave} = \frac{R_{21} + R_{23}}{2}$$

$$B_{ave} = \frac{B_{12} + B_{32}}{2}$$

The average values $R_{AVE}$, $G_{AVE}$ and $B_{AVE}$ are calculated by the expressions (3) when the target pixel is an R pixel and the pixel arrangement is that of FIG. 2C.

$$G_{ave} = \frac{G_{12} + G_{21} + G_{23} + G_{32}}{4} \quad (3)$$

$$R_{ave} = R_{22}$$

$$B_{ave} = \frac{B_{11} + B_{13} + B_{31} + B_{33}}{4}$$

The average values $R_{AVE}$, $G_{AVE}$ and $B_{AVE}$ are calculated by the expressions (4) when the target pixel is a B pixel and the pixel arrangement is that of FIG. 2D.

$$G_{ave} = \frac{G_{12} + G_{21} + G_{23} + G_{32}}{4} \quad (4)$$

$$R_{ave} = \frac{R_{11} + R_{13} + R_{31} + R_{33}}{4}$$

$$B_{ave} = R_{22}$$

The average values $R_{AVE}$, $G_{AVE}$ and $B_{AVE}$ are calculated by the expressions (5) when the target pixel is a G pixel and the pixel arrangement is that of FIG. 2E.

$$G_{ave} = \frac{G_{11} + G_{13} + G_{22} + G_{31} + G_{33}}{5} \quad (5)$$

$$R_{ave} = \frac{R_{12} + R_{32}}{2}$$

$$B_{ave} = \frac{B_{21} + B_{23}}{2}$$

The chroma value calculation circuit 31 performs a computation by any of the expressions (2) through (5) depending on which pattern of pixel arrangements shown in FIGS. 2B through 2E the matrix region has. Further, the chroma value calculation circuit 31 performs a computation expressed in the equation (6) using the obtained average values $R_{AVE}$, $G_{AVE}$ and $B_{AVE}$ to obtain a first color-difference component evaluation value $C_{global}$. More specifically, the color-difference component evaluation value $C_{global}$ is an evaluation value of a color-difference component calculated using color-difference component values obtained on the basis of each pixel average value per color component of pixels present in the matrix region.

$$C_{global} = \frac{|G_{ave} - R_{ave}| + |G_{ave} - B_{ave}|}{2} \quad (6)$$

3-2. Second Color-Difference Component Evaluation Value

Next, a method of calculating the second color-difference component evaluation value will be described. The second color-difference component evaluation value is suitable for evaluation of color-difference components in a matrix region where a particular direction has a strong correlation and whose chroma value greatly varies depending on the method of calculating color-difference component values. For instance, in the case of employing the first color-difference component evaluation value obtained as described in the paragraphs 3-1 as a chroma evaluation value, a gray image containing high-frequency components such as a RETMA chart may be misidentified as a color image as described above. Therefore, the following processing is executed to appropriately obtain a color-difference component evaluation value for such an image having a strong correlation in a particular direction.

The chroma value calculation circuit 31 performs a computation expressed by the equations (7) and (8) using pixel signals of a 3×3 matrix region. More specifically, the equation (7) accumulates color-difference component values in the vertical direction to obtain a vertical color-difference component evaluation value $C_{vertical}$. The equation (8) accumulates color-difference component values in the horizontal direction to obtain a horizontal color-difference component evaluation value $C_{horizontal}$. That is, the computations expressed by the equations (7) and (8) are each intended to accumulate color-difference component values between G and R pixels and color-difference component values between G and B pixels in either the vertical or horizontal direction. Each of the color-difference component evaluation values $C_{vertical}$ and $C_{horizontal}$ is the second color-difference component evaluation value.

$$C_{vertical} = \frac{|P_{11} - P_{21}| + |P_{21} - P_{31}| + 2|P_{12} - P_{22}| + 2|P_{22} - P_{32}| + |P_{13} - P_{23}| + |P_{23} - P_{33}|}{8} \quad (7)$$

$$C_{horizontal} = \frac{|P_{11} - P_{12}| + |P_{12} - P_{13}| + 2|P_{21} - P_{22}| + 2|P_{22} - P_{23}| + |P_{31} - P_{32}| + |P_{32} - P_{33}|}{8} \quad (8)$$

The equations (7) and (8) both have terms multiplied by a coefficient of 2, which is intended to match the number of accumulation of G-R color-difference component values and the number of accumulation of G-B color-difference component values with each other. In the present embodiment, the coefficient of 2 is used to match the number of accumulation between different color-difference components, however, the coefficient may be changed as appropriate.

Further, the color-difference component evaluation values in the horizontal and vertical directions are calculated in the present embodiment, however, a color-difference component evaluation value in a diagonal direction may additionally be calculated to be used for evaluation. For instance, a color-difference component evaluation value $C_{d0}$ in a diagonal direction A inclined clockwise at 45 degrees from the horizontal direction with respect to the target pixel $P_{22}$ and a color-difference component evaluation value $C_{d1}$ in a diagonal direction B which is perpendicular to the diagonal direction A are calculated by the equations (9) or (10). The equations (9) are used when the target pixel $P_{22}$ is a G pixel, and the equations (10) are used when the target pixel $P_{22}$ is an R or a B pixel.

$$C_{d0}=(|(P_{13}+P_{22})/2-P_{12}|+|(P_{13}+P_{22})/2-P_{23}|+|(P_{31}+P_{22})/2-P_{21}|+|(P_{31}+P_{22})/2-P_{32}|)/4$$

$$C_{d1}=(|(P_{11}+P_{22})/2-P_{12}|+|(P_{11}+P_{22})/2-P_{21}|+|(P_{33}+P_{22})/2-P_{23}|+|(P_{33}+P_{22})/2-P_{32}|)/4 \quad (9)$$

$$C_{d0}=(|(P_{12}+P_{21})/2-P_{11}|+|(P_{12}+P_{21})/2-P_{22}|+|(P_{23}+P_{32})/2-P_{22}|+|(P_{23}+P_{32})/2-P_{33}|)/4$$

$$C_{d1}=(|(P_{13}+P_{23})/2-P_{13}|+|(P_{12}+P_{23})/2-P_{22}|+|(P_{21}+P_{32})/2-P_{22}|+|(P_{21}+P_{32})/2-P_{31}|)/4 \quad (10)$$

3-3. Calculation of Chroma Coefficient

The chroma value calculation circuit 31 calculates the three color-difference component evaluation values $C_{global}$, $C_{vertical}$ and $C_{horizontal}$ by the methods described in the paragraphs of 3-1 and 3-2, and further performs a computation expressed by the equation (11) to obtain a minimum value among the color-difference component evaluation values $C_{global}$, $C_{vertical}$ and $C_{horizontal}$ (that is, a value having a minimum level of color-difference components). This minimum value is employed as a chroma evaluation value C of the matrix region to be processed. In other words, the chroma evaluation value C is a value determined in correspondence with each target pixel. In the equation (11), min(x, y, z) indicates a minimum value among x, y and z. As described above, a color-difference component evaluation value in a diagonal direction may additionally be calculated as the second color-difference component evaluation value in addition to the values $C_{vertical}$ and $C_{horizontal}$. In this case, a minimum value shall be selected from among evaluation values including the color-difference component evaluation value in the diagonal direction.

$$C = \min(C_{global}, C_{horizontal}, C_{vertical}) \quad (11)$$

Figure 3:
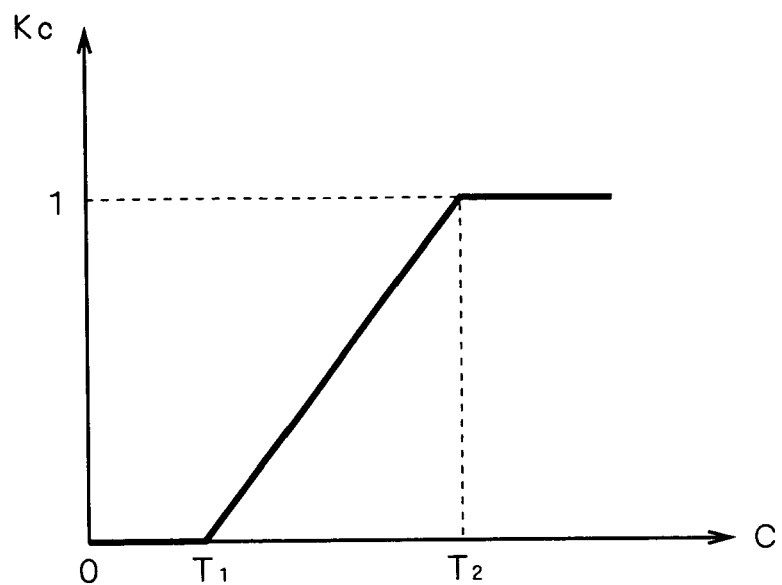
FIG. 3 illustrates the relationship between the chroma value and chroma coefficient.

After calculation of the chroma evaluation value C for the target pixel by performing the above computations in the chroma value calculation circuit 31, the chroma value calculation circuit 31 next normalizes the chroma evaluation value C to obtain a chroma coefficient Kc. More specifically, the chroma value calculation circuit 31 executes normalization as shown in the expressions (12) using two threshold values $T_1$ and $T_2$. FIG. 3 illustrates the relationship between the chroma evaluation value C and chroma coefficient Kc. As shown, the chroma coefficient Kc for distinguishing between a gray image and a color image is set to gradually vary between the threshold values $T_1$ and $T_2$ defined close to a region where a gray image changes to a color image, so that a sudden change in image judgment is alleviated.

$$\text{when } C \leq T_1 \quad K_c = 0 \quad (12)$$
$$\text{when } T_1 < C \leq T_2 \quad K_c = \frac{C - T_1}{T_2 - T_1}$$
$$\text{when } C > T_2 \quad K_c = 1$$

Since the two threshold values $T_1$ and $T_2$ are defined close to the border between a gray image and a color image, optimum values may be determined based on the result of experiments and experiences, however, it is preferable to use variable parameters determined by characteristics of an input image. The characteristics of an input image are determined by, for example, shooting conditions such as exposure time and aperture value. CCD properties, lens optical properties and the like may be taken into account in determining characteristics of an input image. The chroma coefficient Kc thus obtained is used in the selection step which is a post process.

4. Correlation Value Calculation

Figure 4:
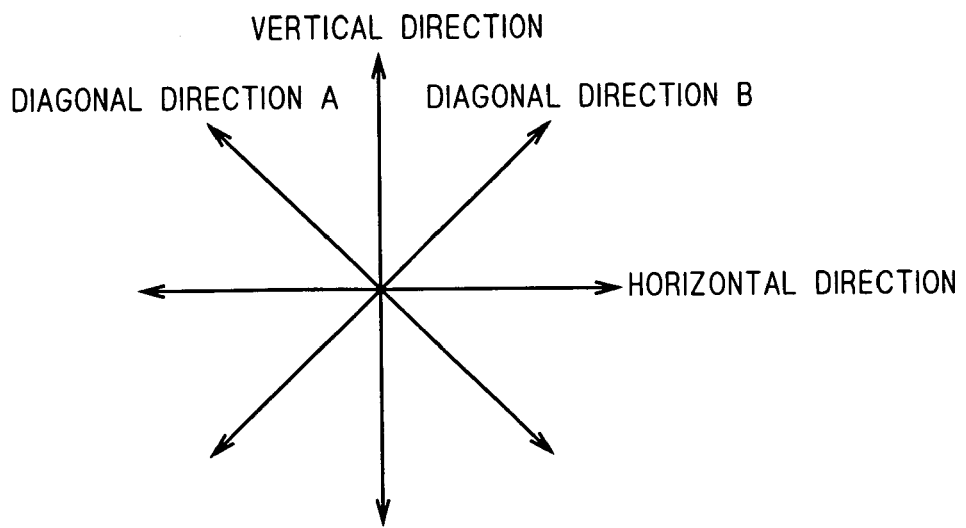
FIG. 4 illustrates four correlated directions.

The correlation value calculation circuit 32 calculates correlation values in four directions in a matrix region using pixel signals of a target pixel and its neighboring pixels. Here, as shown in FIG. 4, correlation values are obtained respectively in the horizontal direction, vertical direction, diagonal direction A inclined clockwise at 45 degrees from the horizontal direction and diagonal direction B which is perpendicular to the direction A. More specifically, a pixel difference value which is a difference in pixel values between the target pixel and a pixel present in each of the four directions is calculated, and pixel difference values are accumulated in each direction to obtain a correlation value.

In the present embodiment, the correlation value calculation circuit 32 calculates both a correlation value for high-chroma color image and a correlation value for low-chroma gray image in each matrix region. Then, a correlated direction is finally determined depending upon selection of either the correlation value for color image or gray image in the selection step which is a post process.

Figure 5A:
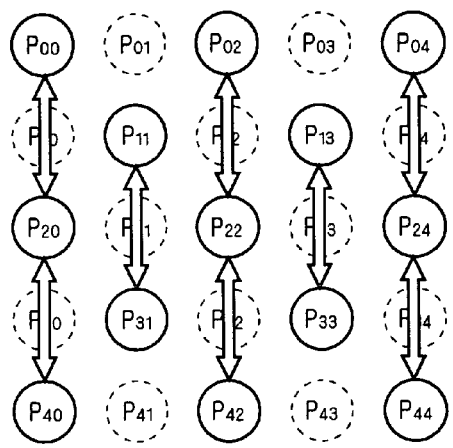
FIGS. 5A and 5B each illustrate a method of calculating a correlation value in the vertical direction in a color region when a target pixel is a G pixel.
Figure 5B:
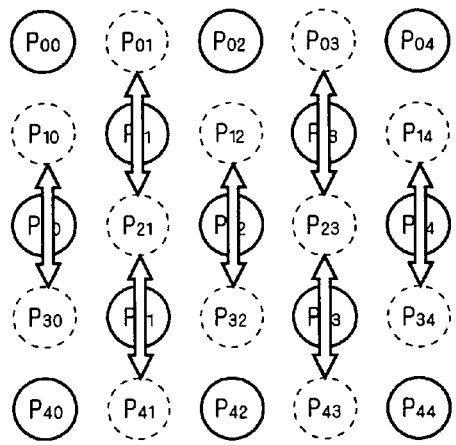

4-1. Correlation Value for High-Chroma Color Image 4-1-1. When Target Pixel is G Pixel First, a method of calculating a correlation value for color image in the case where a target pixel is a G pixel will be described. This is a method employed when the pixel arrangement of a matrix region is as that of FIG. 2B or 2E. The correlation value in the vertical direction is calculated by the equation (13). FIGS. 5A and 5B each illustrate a method of calculating the correlation value in the vertical direction. FIG. 5A relates to G pixels, and FIG. 5B relates to R and B pixels. In this manner, the correlation value for color image is obtained taking into account pixel difference values of all the color components. In FIGS. 5A, 5B through FIG. 16, each two pixels connected with an arrow shown in each drawing are to be subjected to calculation of a pixel difference value.

$$Cv\_c = (|P_{02} - P_{22}| + |P_{22} - P_{42}| + |P_{11} - P_{31}| + |P_{13} - P_{33}| \quad (13)$$
$$+ |P_{00} - P_{20}| + |P_{20} - P_{40}| + |P_{04} - P_{24}| + |P_{24} - P_{44}|$$
$$+ |P_{12} - P_{32}| + |P_{10} - P_{30}| + |P_{14} - P_{34}|$$
$$+ |P_{01} - P_{21}| + |P_{21} - P_{41}| + |P_{03} - P_{23}| + |P_{23} - P_{43}|) \times \frac{1}{15}$$

Figure 6A:
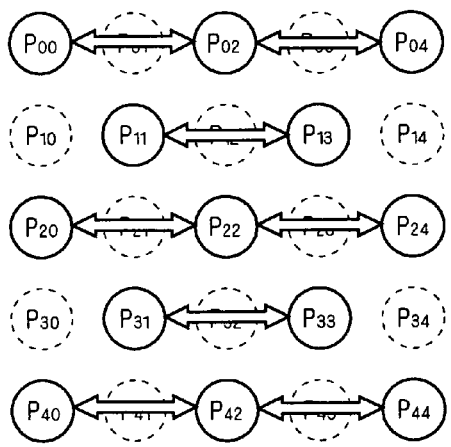
FIGS. 6A and 6B each illustrate a method of calculating a correlation value in the horizontal direction in a color region when a target pixel is a G pixel.
Figure 6B:
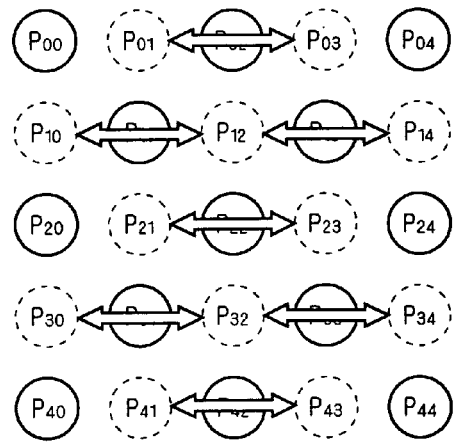

The correlation value in the horizontal direction is calculated by the equation (14). FIGS. 6A and 6B each illustrate a method of calculating the correlation value in the horizontal direction. FIG. 6A relates to G pixels, and FIG. 6B relates to R and B pixels.

$$Ch\_c = (|P_{20} - P_{22}| + |P_{22} - P_{24}| + |P_{11} - P_{13}| + |P_{31} - P_{33}| \quad (14)$$
$$+ |P_{00} - P_{02}| + |P_{02} - P_{04}| + |P_{40} - P_{42}| + |P_{42} - P_{44}|$$
$$+ |P_{21} - P_{23}| + |P_{01} - P_{03}| + |P_{41} - P_{43}|$$
$$+ |P_{10} - P_{12}| + |P_{12} - P_{14}| + |P_{30} - P_{32}| + |P_{32} - P_{34}|) \times \frac{1}{15}$$

Figure 7C:
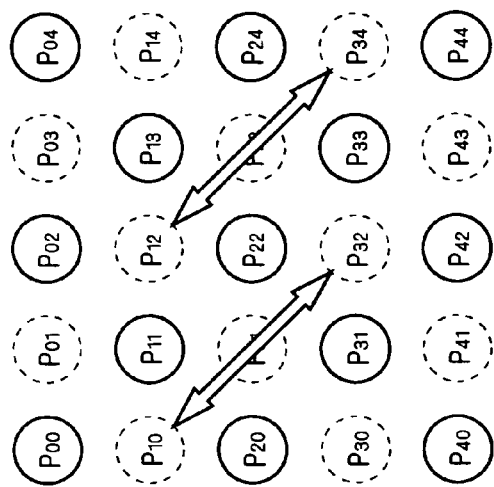
FIGS. 7A to 7C each illustrate a method of calculating a correlation value in a diagonal direction in a color region when a target pixel is a G pixel.
Figure 7B:
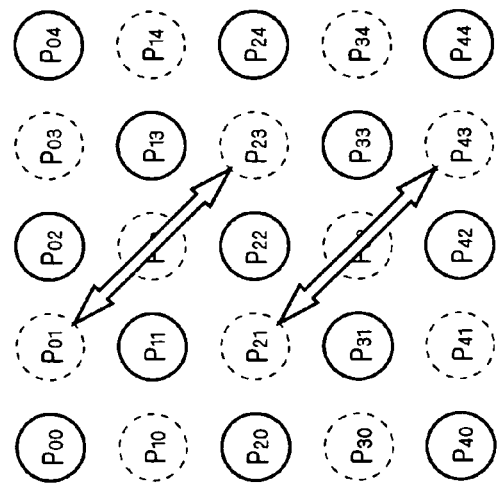
Figure 7A:
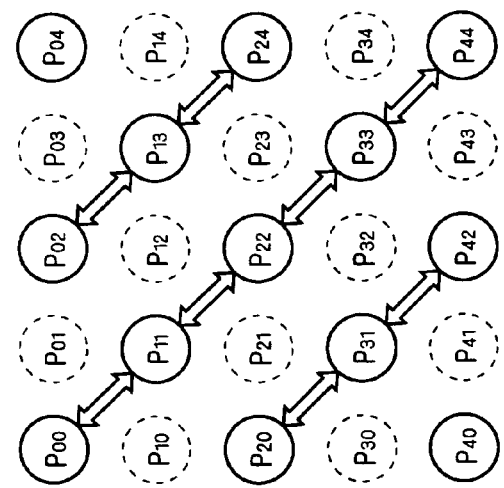

The correlation value in the diagonal direction A is calculated by the equation (15). FIGS. 7A to 7C each illustrate a method of calculating the correlation value in the diagonal direction A. FIG. 7A relates to G pixels, and FIGS. 7B and 7C relates to R and B pixels, respectively.

$$Cd_{A\_}c = (|P_{11} - P_{22}| \times 2 + |P_{22} - P_{33}| \times 2 + |P_{02} - P_{13}| \times 2 + \quad (15)$$
$$|P_{13} - P_{24}| \times 2 + |P_{20} - P_{31}| \times 2 + |P_{31} - P_{42}| \times 2 +$$
$$|P_{00} - P_{11}| \times 2 + |P_{33} - P_{44}| \times 2 + |P_{01} - P_{23}| +$$
$$|P_{21} - P_{43}| + |P_{12} - P_{34}| + |P_{10} - P_{32}|) \times \frac{1}{12}$$

As shown in FIGS. 7A to 7C, the pitch between pixels when calculating a difference value differs between the case related to G pixels and the case related to R or B pixels. Accordingly, in the equation (15), the difference value between G pixels with narrow pitch therebetween is multiplied by 2. This is because the pitch between G pixels to be subjected to computation is half the pitch between R or B pixels, and hence, it is necessary to cope with twice a change in pixel difference values. The multiplier of 2 is only an exemplary number, and may be changed as appropriate.

The correlation value in the diagonal direction B is calculated by the equation (16). FIGS. 8A to 8C each illustrate a method of calculating the correlation value in the diagonal direction B. FIG. 8A relates to G pixels, and FIGS. 8B and 8C relate to R and B pixels, respectively.

$$Cd_{B\_}c = (|P_{13} - P_{22}| \times 2 + |P_{22} - P_{31}| \times 2 + |P_{02} - P_{11}| \times 2 + \quad (16)$$
$$|P_{11} - P_{20}| \times 2 + |P_{24} - P_{33}| \times 2 + |P_{33} - P_{42}| \times 2 +$$
$$|P_{04} - P_{13}| \times 2 + |P_{31} - P_{40}| \times 2 + |P_{03} - P_{21}| +$$
$$|P_{23} - P_{41}| + |P_{12} - P_{30}| + |P_{14} - P_{32}|) \times \frac{1}{12}$$

In the equation (16), the difference value between G pixels is multiplied by 2 similarly to the equation (15). The pitch between each two pixels connected with an arrow in FIGS. 7B, 7C and 8B, 8C differs from that in FIGS. 5A, 5B and 6A, 6B, however, the both pitches are assumed to be the same distance with one pixel interposed therebetween. The multiplier may be determined considering the pitch between pixels as well.

4-1-2. When Target Pixel is B or R Pixel

Figure 9A:
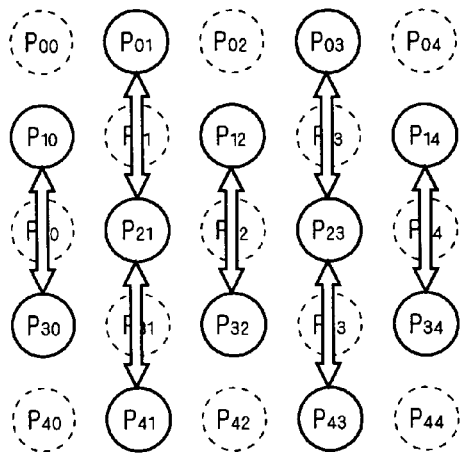
FIGS. 9A and 9B each illustrate a method of calculating a correlation value in the vertical direction in a color region when the target pixel is an R or a B pixel.
Figure 9B:
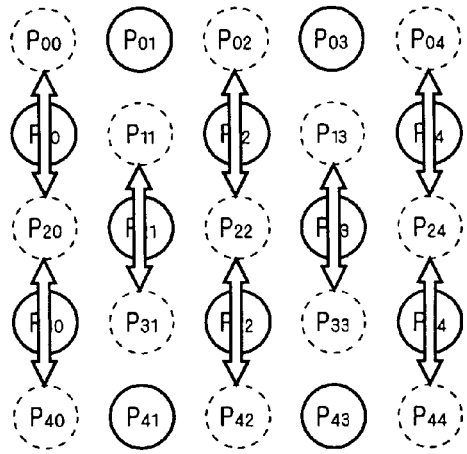

Next, a method of calculating a correlation value for color image when a target pixel is a B or an R pixel. This is a method employed when the pixel arrangement of a matrix region is as that of FIG. 2C or 2D. The correlation value in the vertical direction is calculated by the equation (17). FIGS. 9A and 9B each illustrate a method of calculating the correlation value in the vertical direction. FIG. 9A relates to G pixels, and FIG. 9B relates to R and B pixels.

$$Cv\_c = (|P_{12} - P_{32}| + |P_{01} - P_{21}| + |P_{21} - P_{41}| + |P_{03} - P_{23}| + \qquad (17)$$
$$|P_{23} - P_{43}| + |P_{10} - P_{30}| + |P_{14} - P_{34}| + |P_{11} - P_{31}| +$$
$$|P_{13} - P_{33}| + |P_{02} - P_{22}| + |P_{22} - P_{42}| + |P_{00} - P_{20}| +$$
$$|P_{20} - P_{40}| + |P_{04} - P_{24}| + |P_{24} - P_{44}|) \times \frac{1}{15}$$

Figure 10A:
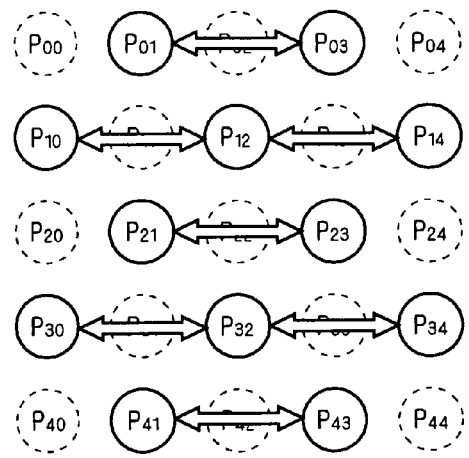
FIGS. 10A and 10B each illustrate a method of calculating a correlation value in the horizontal direction in a color region when the target pixel is an R or a B pixel.
Figure 10B:
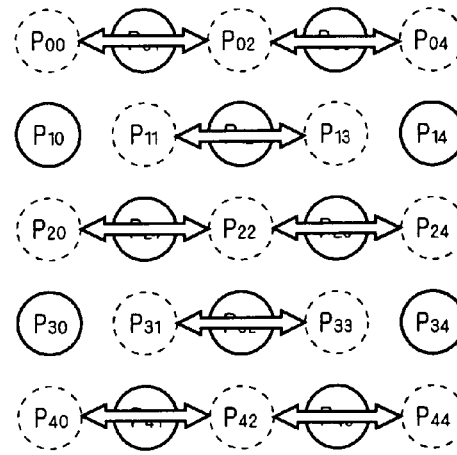

The correlation value in the horizontal direction is calculated by the equation (18). FIGS. 10A and 10B each illustrate a method of calculating the correlation value in the horizontal direction. FIG. 10A relates to G pixels, and FIG. 10B relates to R and B pixels.

$$Ch\_c = (|P_{21} - P_{23}| + |P_{10} - P_{12}| + |P_{12} - P_{14}| + |P_{30} - P_{32}| + \qquad (18)$$
$$|P_{32} - P_{34}| + |P_{01} - P_{03}| + |P_{41} - P_{43}| + |P_{11} - P_{13}| +$$
$$|P_{31} - P_{33}| + |P_{20} - P_{22}| + |P_{22} - P_{24}| + |P_{00} - P_{02}| +$$
$$|P_{02} - P_{04}| + |P_{40} - P_{42}| + |P_{42} - P_{44}|) \times \frac{1}{15}$$

Figure 11A:
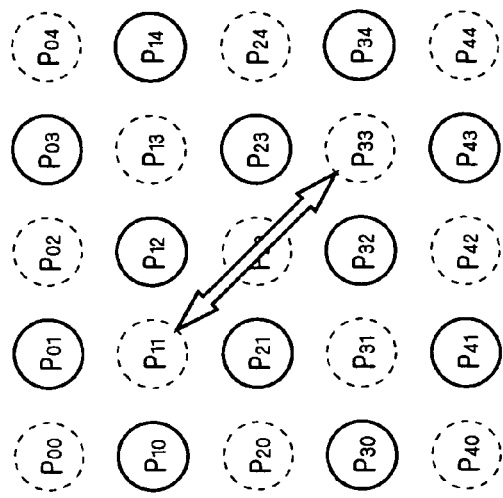
FIGS. 11A to 11C each illustrate a method of calculating a correlation value in a diagonal direction in a color region when the target pixel is an R or a B pixel.
Figure 11B:
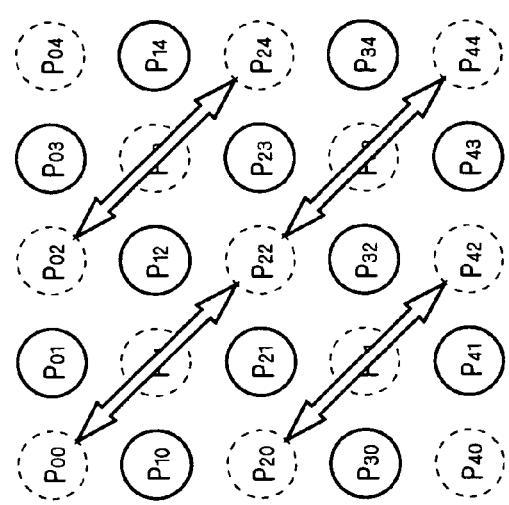
Figure 11C:
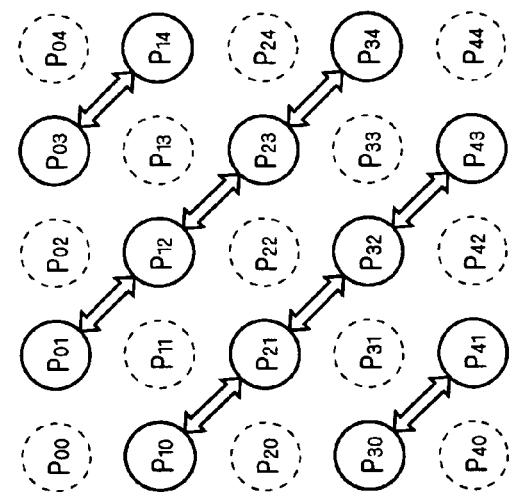

The correlation value in the diagonal direction A is calculated by the equation (19). FIGS. 11A to 11C each illustrate a method of calculating the correlation value in the diagonal direction A. FIG. 11A relates to G pixels, and FIGS. 11B and 11C relate to R and B pixels, respectively.

$$Cd_{A}\_c = (|P_{12} - P_{23}| \times 2 + |P_{21} - P_{32}| \times 2 + |P_{01} - P_{12}| \times 2 + \qquad (19)$$
$$|P_{23} - P_{34}| \times 2 + |P_{10} - P_{21}| \times 2 + |P_{32} - P_{43}| \times 2 +$$
$$|P_{03} - P_{14}| \times 2 + |P_{30} - P_{41}| \times 2 + |P_{11} - P_{33}| +$$
$$|P_{00} - P_{22}| + |P_{22} - P_{44}| + |P_{02} - P_{24}| + |P_{20} - P_{42}|) \times \frac{1}{13}$$

The correlation value in the diagonal direction B is calculated by the equation (20). FIGS. 12A to 12C each illustrate a method of calculating the correlation value in the diagonal direction B. FIG. 12A relates to G pixels, and FIGS. 12B and 12C relate to R and B pixels, respectively.

$$Cd_{B}\_c = (|P_{12} - P_{21}| \times 2 + |P_{23} - P_{32}| \times 2 + |P_{03} - P_{12}| \times 2 + \qquad (20)$$
$$|P_{21} - P_{30}| \times 2 + |P_{14} - P_{23}| \times 2 + |P_{32} - P_{41}| \times 2 +$$
$$|P_{01} - P_{10}| \times 2 + |P_{34} - P_{43}| \times 2 + |P_{13} - P_{31}| +$$
$$|P_{04} - P_{22}| + |P_{22} - P_{40}| + |P_{02} - P_{20}| + |P_{24} - P_{42}|) \times \frac{1}{13}$$

In the equations (19) and (20), the difference value between G pixels is multiplied by 2 similarly to the case described with reference to the equation (13). The pitch between each two pixels connected with an arrow in FIGS. 11B, 11C and 12B, 12C differs from that in FIGS. 9A, 9B and 10A, 10B, however, the both pitches are assumed to be the same distance with one pixel interposed therebetween. The multiplier may be determined considering the pitch between pixels as well.

4-2. Correlation Value for Low-Chroma Gray Image

Figure 13:
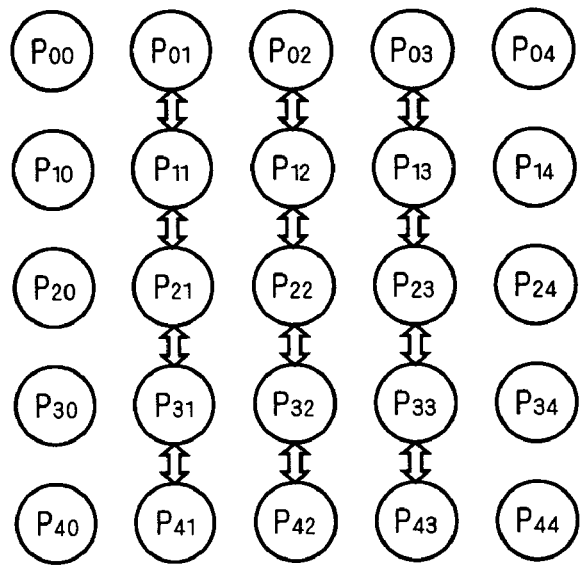
FIG. 13 illustrates a method of calculating a correlation value in the vertical direction in a gray region.

In a low-chroma gray image, a correlation value is calculated without considering which one of R, G and B pixels the target pixel is. More specifically, the correlation value is obtained by the following common calculation method irrespective of which pattern of pixel arrangements shown in FIGS. 2B to 2E the matrix region has. The correlation value in the vertical direction is calculated by the equation (21). FIG. 13 illustrates a method of calculating the correlation value in the vertical direction.

$$Cv\_m = (|P_{02} - P_{12}| + |P_{12} - P_{22}| + |P_{22} - P_{32}| + |P_{32} - P_{42}| + \qquad (21)$$
$$|P_{01} - P_{11}| + |P_{11} - P_{21}| + |P_{21} - P_{31}| + |P_{31} - P_{41}| +$$
$$|P_{03} - P_{13}| + |P_{13} - P_{23}| + |P_{23} - P_{33}| + |P_{33} - P_{43}|) \times \frac{1}{6}$$

Figure 14:
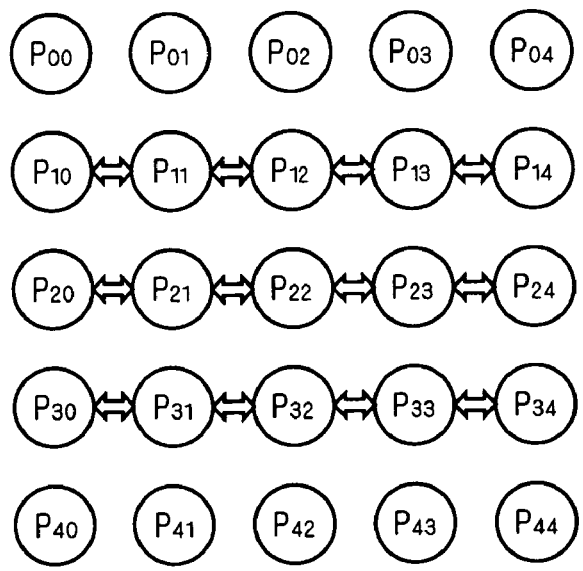
FIG. 14 illustrates a method of calculating a correlation value in the horizontal direction in a gray region.

The correlation value in the horizontal direction is calculated by the equation (22). FIG. 14 illustrates a method of calculating the correlation value in the horizontal direction.

$$Ch\_m = (|P_{20} - P_{21}| + |P_{21} - P_{22}| + |P_{22} - P_{23}| + |P_{23} - P_{24}| + \qquad (22)$$
$$|P_{10} - P_{11}| + |P_{11} - P_{12}| + |P_{12} - P_{13}| + |P_{13} - P_{14}| +$$
$$|P_{30} - P_{31}| + |P_{31} - P_{32}| + |P_{32} - P_{33}| + |P_{33} - P_{34}|) \times \frac{1}{6}$$

Figure 15:
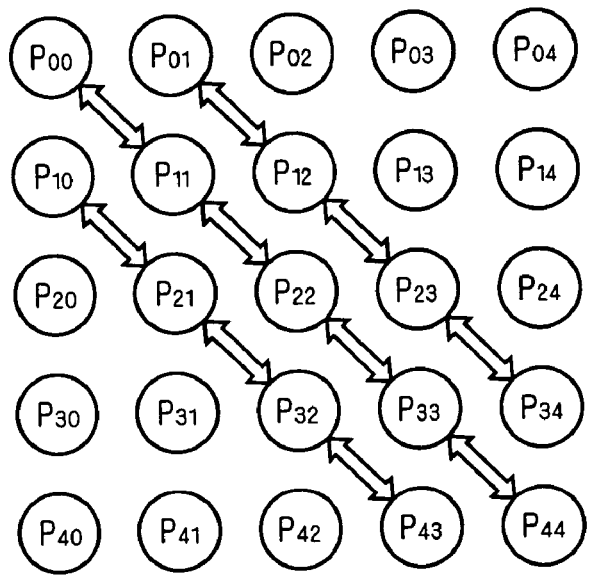
FIG. 15 illustrates a method of calculating a correlation value in a diagonal direction in a gray region.

The correlation value in the diagonal direction A is calculated by the equation (23). FIG. 15 illustrates a method of calculating the correlation value in the diagonal direction A.

$$Cd_{A}\_m = (|P_{00} - P_{11}| + |P_{11} - P_{22}| + |P_{22} - P_{33}| + |P_{33} - P_{44}| + \qquad (23)$$
$$|P_{10} - P_{21}| + |P_{21} - P_{32}| + |P_{32} - P_{43}| + |P_{01} - P_{12}| +$$
$$|P_{12} - P_{23}| + |P_{23} - P_{34}|) \times \frac{1}{5}$$

Figure 16:
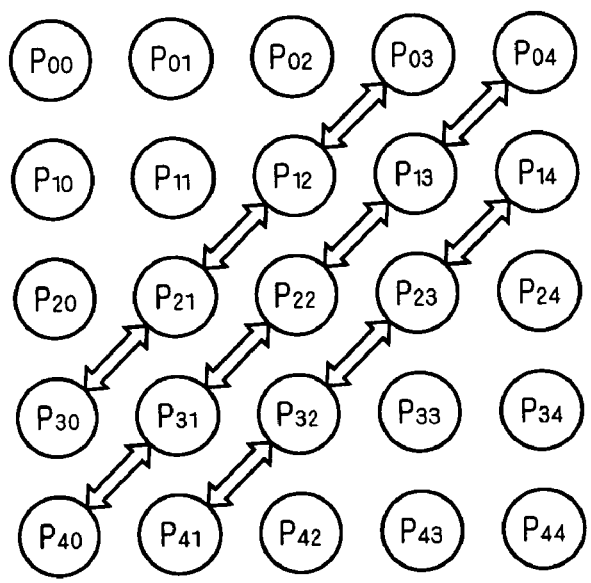
FIG. 16 illustrates a method of calculating a correlation value in another diagonal direction in a gray region.

The correlation value in the diagonal direction B is calculated by the equation (24). FIG. 16 is a method of calculating the correlation value in the diagonal direction B.

$$Cd_{B}\_m = (|P_{04} - P_{13}| + |P_{13} - P_{22}| + |P_{22} - P_{31}| + |P_{31} - P_{40}| + \qquad (24)$$
$$|P_{03} - P_{12}| + |P_{12} - P_{21}| + |P_{21} - P_{30}| + |P_{14} - P_{23}| +$$
$$|P_{23} - P_{32}| + |P_{32} - P_{41}|) \times \frac{1}{5}$$

The pitch between each two pixels connected with an arrow in FIGS. 13 and 14 differs from that in FIGS. 15 and 16, however, any coefficient that is determined considering the pitch between pixels is not multiplied in these cases, unlike the case described with reference to the equation (15). This is because the difference in pitch between pixels is not very large, however, the pixel difference values in the equations (21) and (22) may be multiplied by the root of 2, for example.

For easy comparison with the aforementioned correlation value for color image, the equations (21) to (24) are intended to have the same scale. More specifically, the pitch between each two pixels to be subjected to computation shown in FIGS. 13 to 16 is the distance between pixels adjacent to each other. Accordingly, the pixel difference values are each multiplied by 2 in the equations (21) to (24) to match the scale. As a result, the last multiplier (⅙ and ⅕) in each equation is twice the reciprocal of the number of accumulation. However, the correlated direction in a gray image is determined using the correlation value for gray image only, and therefore, the scale is not necessarily be matched in the respective equations.

5. Selection of Correlation Judging Method and Pixel Interpolation Method

The selection circuit 33 selects a correlation judging method and a pixel interpolation method on the basis of the relationship between the chroma coefficient Kc calculated by the chroma value calculation circuit 31 and threshold values TH1, TH2. More specifically, as to correlation judgment, a correlation judging method employing the correlation value for gray image or a correlation judging method employing the correlation value for color image is selected. As to pixel interpolation, a pixel interpolation method for gray image or a pixel interpolation method for color image is selected.

Figure 17:
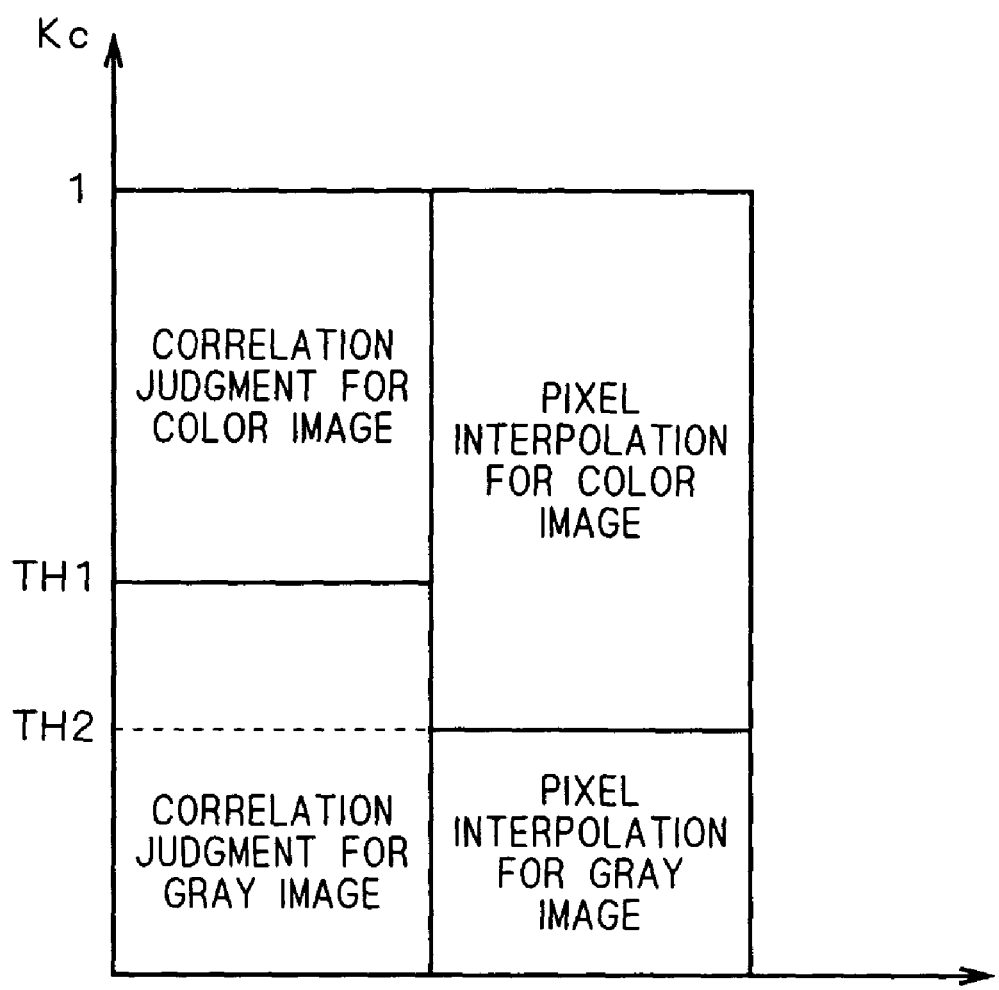
FIG. 17 illustrates the criterion for distinguishing between a gray image and a color image.

FIG. 17 illustrates the type of correlation judging method and pixel interpolation method determined by the relationship between the chroma coefficient Kc and threshold values TH1, TH2. More specifically, there are three combinations classified into (a) to (c):

(a) when Kc>TH1 holds,
the correlation judging method for color image and pixel interpolation method for color image are selected;

(b) when TH1≧Kc>TH2 holds,
the correlation judging method for gray image and pixel interpolation method for color image are selected; and (c) when TH2≧Kc holds,
the correlation judging method for gray image and pixel interpolation method for gray image are selected.

In the present embodiment, as described, there are three patterns of combination of correlation judging method and pixel interpolation method depending on the relationship between the chroma coefficient Kc and threshold values TH1, TH2. That is, the present embodiment is not intended to distinguish between a gray image and a color image by setting one threshold value, but is intended to blur a boundary region between a gray image and a color image by defining the two threshold values TH1 and TH2. This makes it possible to reduce a visual sense of unusualness after interpolation in an image positioned near the border between a gray image and a color image.

More specifically, in an image positioned on and around the border between a gray image and a color image, the respective RGB components have almost the same value, but the value slightly varies. Therefore, giving attention to that each of RGB components little varies when judging correlation, a correlation value is calculated using pixels as close as possible to the target pixel without distinguishing between R, G and B pixels. This can improve the accuracy in judging a correlated direction. In contrast, when performing pixel interpolation on an image assuming the image as a gray image ignoring variations in respective RGB components, color aliasing may occur. Therefore, as to pixel interpolation, the pixel interpolation for color image shall be performed.

In the present embodiment, the chroma coefficient Kc obtained by normalizing the chroma evaluation value C is compared with the threshold values TH1 and TH2 to distinguish between a gray image and a color image, however, this is merely for convenience in processing. This is essentially identical to making distinction between a gray image and a color image by comparing the chroma evaluation value C with two threshold values. After selection of the correlation judging method and pixel interpolation method, the selection circuit 33 supplies selection information to the pixel interpolation circuit 34.

6. Pixel Interpolation

Next, pixel interpolation executed by the pixel interpolation circuit 34 will be described. The pixel interpolation circuit 34 determines a correlated direction on the basis of the selection information supplied from the selection circuit 33 and executes pixel interpolation on the basis of the selection information. As described above, a high-chroma color image and a low-chroma gray image are subjected to different pixel interpolation processes.

6-1. Determination of Correlated Direction

The pixel interpolation circuit 34 selects the result of correlation value calculation for either a gray image or a color image to determine a correlated direction. More specifically, when the pattern (b) or (c) is selected in the selection circuit 33, the correlated direction is determined on the basis of the correlation value for gray image obtained by the equations (21) to (24). When the pattern (a) is selected and the target pixel is a G pixel, the correlated direction is determined on the basis of the correlation value for color image obtained by the equations (13) to (16). When the pattern (a) is selected and the target pixel is a B or an R pixel, the correlated direction is determined on the basis of the correlation value for color image obtained by the equations (17) to (20).

The correlated direction is determined by comparing four correlation values calculated by the equations (13) to (16) or those values calculated by the equations (17) to (20) or those values calculated by the equations (21) to (24), and basically, a direction having a minimum correlation value among the four correlation values is determined to have a strong correlation. In other words, it is judged that a correlation is stronger as the cumulative value of pixel difference values decreases.

When evaluating pixel difference values, comparison with a threshold value may be performed. More specifically, a direction having the minimum correlation value among the correlation values calculated with respect to the four directions is a candidate for a direction having a strong correlation, and further, it is evaluated whether or not the minimum correlation value is lower than a predetermined threshold value. When the minimum correlation value is lower than the threshold value, the candidate direction is finally determined as a direction having a strong correlation. When it is judged that all the correlation values in the four directions are lower than the predetermined threshold value and the respective directions have a strong correlation, and that the correlation values have little difference between each other, average interpolation may be performed. When it is judged that all the correlation values in the four directions are not lower than the predetermined threshold value and none of the directions have a correlation, median interpolation may be performed.

6-2. Pixel Interpolation

After determination of the correlated direction by the aforementioned processing, the pixel interpolation circuit 34 selects either the pixel interpolation for gray image or that for color image on the basis of the selection information. More specifically, the pixel interpolation for gray image is executed when the pattern (c) is selected in the selection circuit 33, and the pixel interpolation for color image is executed when the pattern (a) or (b) is selected.

6-2-1. Pixel Interpolation for Gray Image

The pixel interpolation for gray image is executed in the determined correlated direction when the pattern (c) is selected in the selection circuit 33. The pixel interpolation for gray image is executed using pixels present in the determined correlated direction without distinguishing whether the target pixel is either R, G or B pixel. That is, the target pixel is interpolated using its neighboring pixels without considering which one of R, G and B pixels the target pixel is or considering which one of R, G and B pixels the neighboring pixels are.

More specifically, when the correlation value in the vertical direction is judged to be high, pixel interpolation is executed by the equation (25).

$$S_{out} = \frac{P_{12} + 2 \times P_{22} + P_{32}}{4} \qquad (25)$$

When the correlation value in the horizontal direction is judged to be high, pixel interpolation is executed by the equation (26).

$$S_{out} = \frac{P_{21} + 2 \times P_{22} + P_{23}}{4} \qquad (26)$$

When the correlation value in the diagonal direction A is judged to be high, pixel interpolation is executed by the equation (27).

$$S_{out} = \frac{P_{11} + 2 \times P_{22} + P_{33}}{4} \qquad (27)$$

When the correlation value in the diagonal direction B is judged to be high, pixel interpolation is executed by the equation (28).

$$S_{out} = \frac{P_{13} + 2 \times P_{22} + P_{31}}{4} \qquad (28)$$

In the equations (25) to (28), the term of $P_{22}$ is multiplied by 2 in order to assign weights according to the distance from the target pixel. When all the four directions have a strong correlation and the correlation values in the directions have little difference between each other, average interpolation may be performed as described above. When it is judged that none of the directions have a correlation, median interpolation may be performed.

6-2-2. Pixel Interpolation for Color Image

When the pattern (a) or (b) is selected in the selection circuit 33, pixel interpolation for color image is executed in the determined correlated direction. The pixel interpolation for color image have different methods of interpolation computation depending on which one of R, G and B pixels the target pixel is. That is, pixel interpolation is performed using pixels present in the determined correlated direction having the same color as a to-be-interpolated pixel. For instance, when the target pixel is a G pixel and when the vertical direction is judged to have a strong correlation, R and B color components of the target pixel are interpolated using R and B pixels present in the vertical direction, respectively. When the target pixel is a G pixel and when the horizontal direction is judged to have a strong correlation, B and R color components of the target pixel are interpolated using B and R pixels present in the horizontal direction, respectively.

When there are pixels having a color component to be subjected to interpolation on a line extending in a direction in which interpolation is to be performed, pixel interpolation can be executed by calculating an average value of pixels having the same color present on that line or performing linear interpolation. However, there may exist no pixel having a color component to be subjected to interpolation on the line extending in a direction in which interpolation is to be performed depending on the pixel arrangement. In such cases, a method shall be employed which estimates a value of a pixel to be subjected to interpolation on the basis of the rate of change (Laplacian) in a direction perpendicular to the line in which interpolation is to be performed.

As described, the pixel interpolation for color image is intended to interpolate a target pixel subjected to interpolation using pixels present in the correlated direction having the same color as the target pixel. Alternatively, when there exists no pixel in the correlated direction having the same color as the target pixel, the target pixel is interpolated using an estimated value for the same color as the target pixel at a pixel present in the direction. For instance, the method described in Japanese Patent Application No. 2004-199233 filed by the assignee of the present application can be employed.

As described above, the image processing circuit 3A according to the present embodiment obtains a chroma evaluation value of a matrix region and determines the correlation judging method and pixel interpolation method for a target pixel in that region on the basis of the chroma evaluation value. To distinguish between a gray image and a color image on the basis of the chroma evaluation value, the two threshold values TH1 and TH2 are used. The correlation judging method for gray image and pixel interpolation method for color image are employed for an image positioned on and around the border between a gray image and a color image, which achieves reduction of color aliasing and improved resolution.

In this embodiment, the correlation value calculation circuit 32 first calculates both the correlation value for gray image and that for color image, and the selection circuit 33 determines which one of the correlation values to be used, and determines the correlated direction using the determined correlation value. As an alternative example, the correlation value calculation circuit 32 may first determine which one of the correlation judging method for gray image and that for color image to be used on the basis of the chroma evaluation value C obtained by the chroma value calculation circuit 31, and then, calculate the correlation value either for gray image or color image. This method is intended to first perform a classification using the threshold value TH2 among classifications of the chroma evaluation value C using the threshold values shown in FIG. 17.

Second Preferred Embodiment

Figure 18:
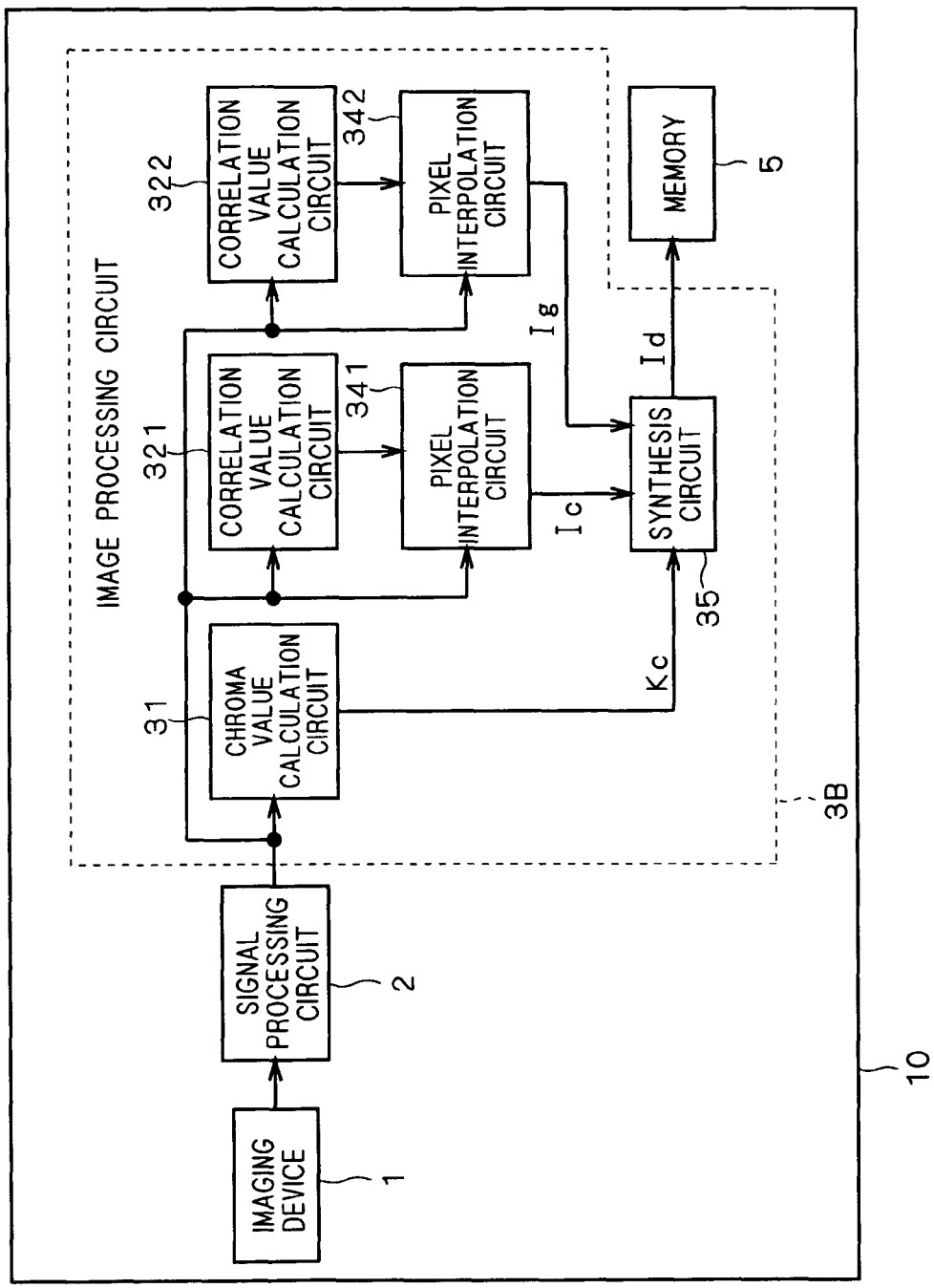
FIG. 18 is a block diagram illustrating a digital camera according to a second preferred embodiment of the invention.

FIG. 18 is a block diagram illustrating a digital camera 10 according to a second preferred embodiment of the present invention. The present embodiment differs from the first preferred embodiment in that the image processing circuit 3A is replaced by an image processing circuit 3B.

The image processing circuit 3B includes the chroma value calculation circuit 31 similarly to the image processing circuit 3A, but without the selection circuit 33, and includes correlation value calculation circuits 321 and 322 instead of the correlation value calculation circuit 32 and pixel interpolation circuits 341 and 342 instead of the pixel interpolation circuit 34, and further includes a synthesis circuit 35.

The correlation value calculation circuits 321 and 322 according to the present embodiment calculate a correlation value for color image and a correlation value for gray image, respectively, to determine a correlated direction on the basis of the correlation values. Correlation value calculation and determination of correlated direction are performed similarly to the first preferred embodiment.

The pixel interpolation circuits 341 and 342 execute pixel interpolation for color image and pixel interpolation for gray image, respectively. These pixel interpolations can also be performed similarly to the first preferred embodiment.

The correlation value calculation circuit 321 and pixel interpolation circuit 341 execute pixel interpolation for color image on a target pixel using the pixel interpolation method for color image, to obtain a pixel value Ic.

The correlation value calculation circuit 322 and pixel interpolation circuit 342 execute pixel interpolation for gray image on the target pixel using the pixel interpolation method for gray image, to obtain a pixel value Ig.

The synthesis circuit 35 combines the pixel values Ic and Ig in a proportion which will be described later. Weighting coefficients k and (1−k) determined depending on the chroma coefficient Kc obtained by the chroma value calculation circuit 31 is used for this proportion. The weighting coefficient k and chroma coefficient Kc have a positive correlation with each other, and therefore, the proportion has a positive correlation with the chroma evaluation value C.

Figure 19:
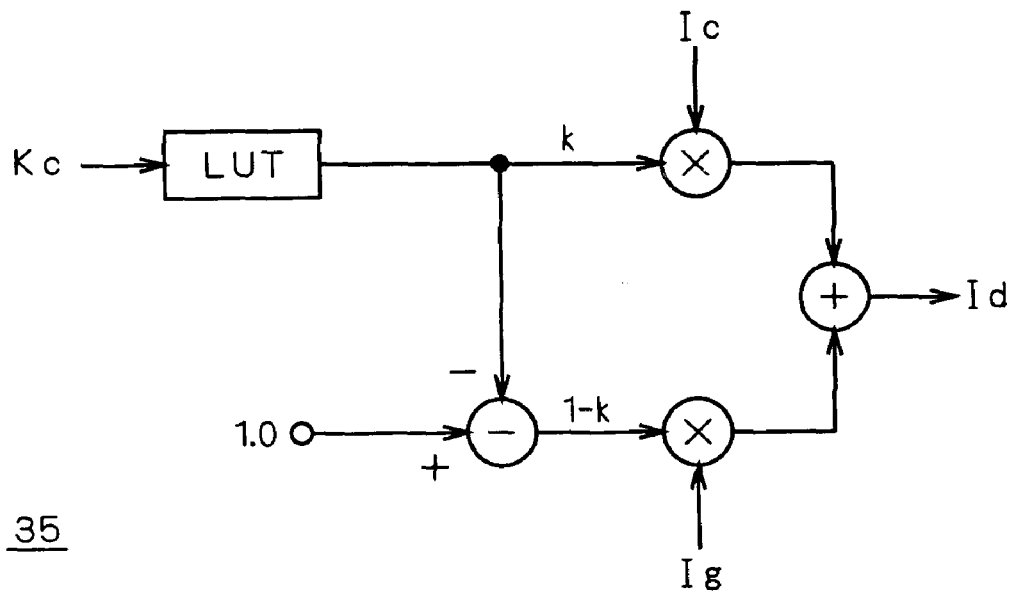
FIG. 19 is a block diagram illustrating the addition of a pixel value obtained by pixel interpolation for color image and a pixel value obtained by pixel interpolation for gray image.

FIG. 19 is a block diagram illustrating the structure of the synthesis circuit 35. The synthesis circuit 35 converts the chroma coefficient Kc into the weighting coefficient k using LUT (look up table), for example. A subtractor subtracts the weighting coefficient k from 1 to obtain the weighting coefficient (1−k). Then, a multiplier multiplies the pixel value Ic by the weighting coefficient k, and the pixel value Ig by the weighting coefficient (1−k). Then, an adder calculates a composite pixel value Id=Ic·k+Ig·(1−k). A pixel signal having the composite pixel value Id is stored in the memory 5.

As described above, the chroma coefficient Kc is a normalized value of the chroma evaluation value C, and a color image is more likely to have a higher chroma evaluation value C while a gray image is more likely to have a lower chroma evaluation value C. Accordingly, the pixel value Ic obtained by execution of the pixel interpolation for color image is multiplied by the weighting coefficient k positively correlated with the chroma coefficient Kc, and the pixel value Ig obtained by execution of the pixel interpolation for gray image is multiplied by the weighting coefficient (1−k).

Addition in the aforementioned proportion allows pixel interpolation to be performed on a pixel having a chroma value on and around the border between a color image and a gray image in addition to pixel interpolation performed on a pixel that can definitely be distinguished between a color image and a gray image.

Figure 20:
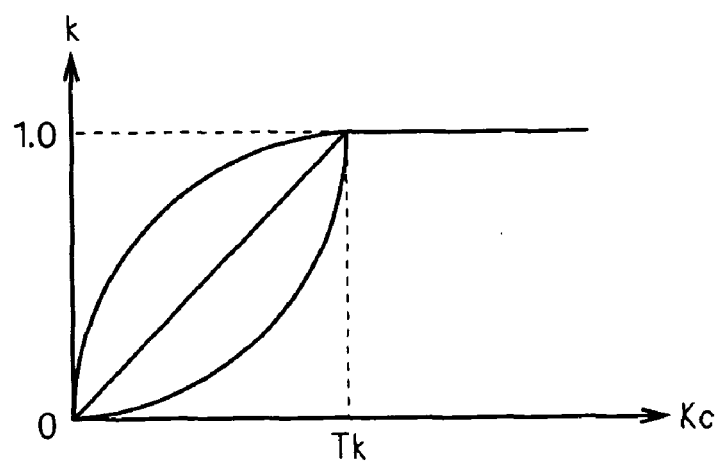
FIG. 20 is a graph illustrating the relationship between the weighting coefficient used in addition of pixel values and chroma coefficient.

FIG. 20 is a graph illustrating the relationship between the weighting coefficient k and chroma coefficient Kc. When the chroma coefficient Kc is equal to or higher than a predetermined threshold value Tk, the weighting coefficient k takes 1. When the chroma coefficient Kc is lower than a predetermined threshold value Tk, the weighting coefficient k takes a value between 0 and 1 in accordance with the value of the chroma coefficient Kc. For instance, one of the three curves depicted in the graph may be employed. The minimum value of the weighting coefficient k may be set at a positive value.

Third Preferred Embodiment

Figure 21:
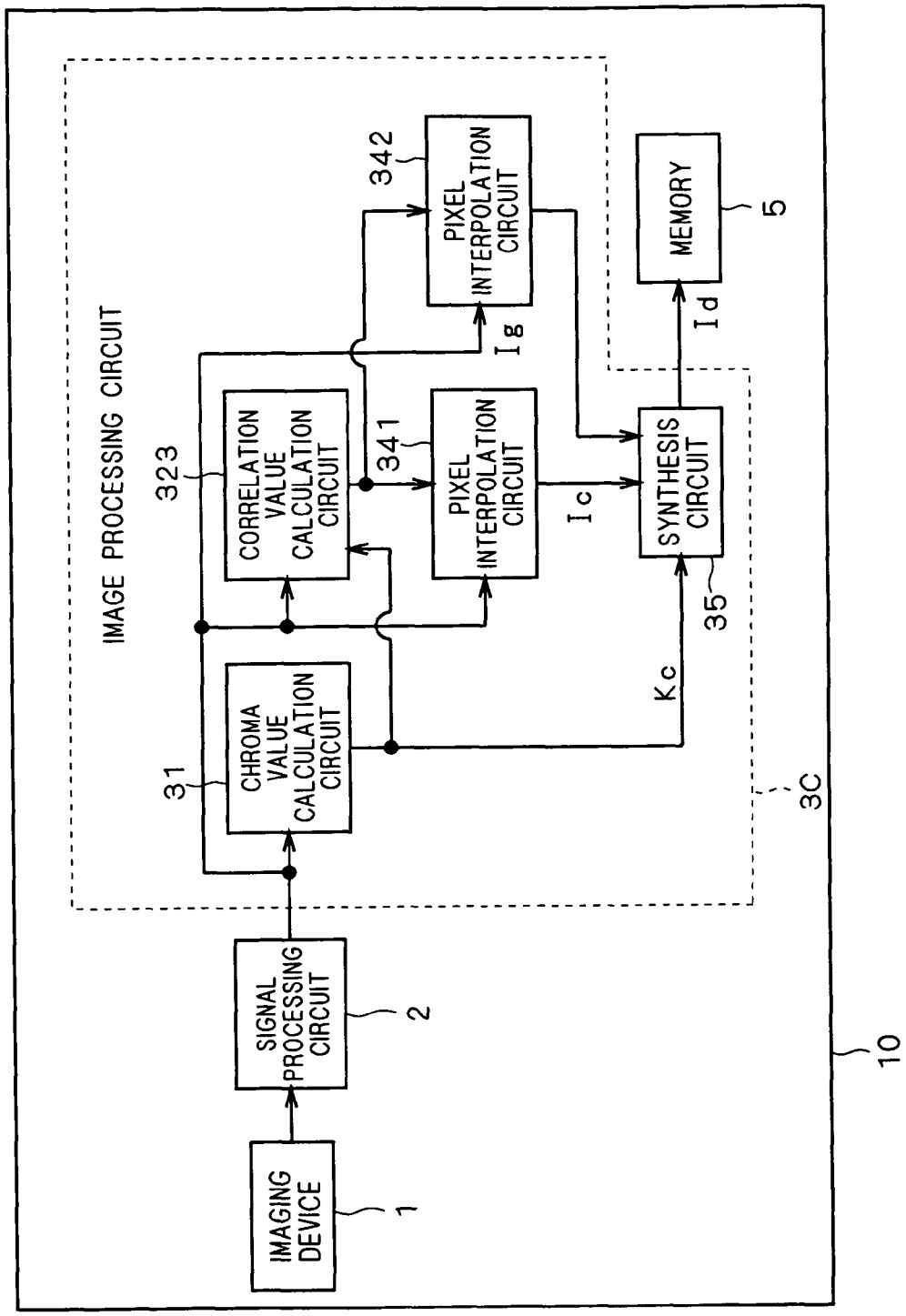
FIG. 21 is a block diagram illustrating a digital camera according to a third preferred embodiment of the invention.

FIG. 21 is a block diagram illustrating a digital camera 10 according to a third preferred embodiment of the present invention. The present embodiment differs from the first preferred embodiment in that the image processing circuit 3A is replaced by an image processing circuit 3C.

The image processing circuit 3C includes the chroma value calculation circuit 31, pixel interpolation circuits 341, 342 and synthesis circuit 35 similarly to the image processing circuit 3B, and includes a correlation value calculation circuit 323 instead of the correlation value calculation circuits 321 and 322.

The operation of the chroma value calculation circuit 31 has been described in the first preferred embodiment, and operations of the pixel interpolation circuits 341, 342 and synthesis circuit 35 have been described in the second preferred embodiment. Accordingly, repeated explanation will be omitted in this preferred embodiment.

The correlation value calculation circuit 323 selects the correlation judging method for color image when the chroma coefficient Kc is higher than the threshold value TH1 and the correlation judging method for gray image when the chroma coefficient Kc is not higher than the threshold value TH1, to determine the correlated direction.

Then, both the pixel interpolation circuits 341 and 342 execute pixel interpolation in the correlated direction. As described in the second preferred embodiment, the pixel interpolation circuit 341 executes color pixel interpolation using the pixel interpolation method for color image to obtain the pixel value Ic, and the pixel interpolation circuit 342 executes gray pixel interpolation using the pixel interpolation method for gray image to obtain the pixel value Ig.

As described, the synthesis circuit 35 combines the pixel values Ic and Ig in a proportion positively correlated with the chroma evaluation value C. Addition in such proportion allows pixel interpolation to be performed on a pixel having a chroma value on and around the border between a color image and a gray image.

In the first preferred embodiment, a pixel having undergone the pixel interpolation for gray image and a pixel having undergone the pixel interpolation for color image may be positioned adjacent to each other. In this case, improvements in image resolution may be less successful. In the second and third preferred embodiments, however, the difference in pixel interpolation between adjacent pixels is likely to be smaller than in the first preferred embodiment, which results in more effective improvements in image resolution.

The above respective preferred embodiments have described pixel signals output from the imaging device 1 as pixel signals of RGB Bayer pattern, however, the pixel interpolation method according to the present invention is applicable to various types of pixel signals such as pixel signals output from an imaging sensor equipped with a complementary color filter array or an imaging sensor having a honeycomb arrangement.

While the invention has been shown and described in detail, the foregoing description is in all aspects illustrative and not restrictive. It is therefore understood that numerous modifications and variations can be devised without departing from the scope of the invention.

What is claimed is:

1. A pixel interpolation method implemented in an imaging processing apparatus comprising:
    inputting, at the imaging processing apparatus, a pixel signal of a predetermined color space;
    calculating, at the imaging processing apparatus, a chroma evaluation value of a region formed by a target pixel and neighboring pixels;
    selecting, at the imaging processing apparatus, one of a plurality of predetermined correlation judging methods and one of a plurality of predetermined pixel interpolation methods on the basis of said chroma evaluation value;
    determining, by the selected predetermined correlation judging method and at the imaging processing apparatus, a correlated direction; and executing, at the imaging processing apparatus, pixel interpolation according to the selected predetermined pixel interpolation method on said target pixel in the correlated direction determined by said selected predetermined correlation judging method.

2. The pixel interpolation method according to claim 1, further comprising:
comparing said chroma evaluation value with a first threshold value to select one of a correlation judging method for gray image and a correlation judging method for color image included in the plurality of predetermined correlation judging methods; and
comparing said chroma evaluation value with a second threshold value to select one of a pixel interpolation method for gray image and a pixel interpolation method for color image included in the plurality of predetermined pixel interpolation methods.

3. The pixel interpolation method according to claim 2, wherein
the calculating comprises calculating the chroma evaluation value including a first color-difference component evaluation value and a second color-difference component evaluation value,
the pixel interpolation method further comprising:
calculating said first color-difference component evaluation value without using a position of the target pixel in the region formed by the target pixel and neighboring pixels; and
calculating said second color-difference component evaluation value using the position of the target pixel in the region formed by the target pixel and neighboring pixels.

4. The pixel interpolation method according to claim 1, wherein
the calculating comprises calculating the chroma evaluation value including a first color-difference component evaluation value and a second color-difference component evaluation value,
the pixel interpolation method further comprising:
calculating said first color-difference component evaluation value without using a position of the target pixel in the region formed by the target pixel and neighboring pixels; and
calculating said second color-difference component evaluation value using the position of the target pixel in the region formed by the target pixel and neighboring pixels.

5. A pixel interpolation method implemented in an imaging processing apparatus comprising:
inputting, at the imaging processing apparatus, a pixel signal of a predetermined color space;
calculating, at the imaging processing apparatus, a chroma evaluation value of a region formed by a target pixel and neighboring pixels;
selecting, at the imaging processing apparatus, a correlation judging method and a pixel interpolation method on the basis of said chroma evaluation value, the selecting including
using predetermined two threshold values TH1 and TH2 where TH1>TH2;
selecting a correlation judging method for gray image and a pixel interpolation method for gray image when said chroma evaluation value is not higher than said threshold value TH2,
selecting said correlation judging method for gray image and a pixel interpolation method for color image when said chroma evaluation value is higher than said threshold value TH2 and not higher than said threshold value TH1, and
selecting a correlation judging method for color image and said pixel interpolation method for color image when said chroma evaluation value is higher than said threshold value TH1; and
executing, at the imaging processing apparatus, the pixel interpolation on said target pixel in the correlated direction determined by said selected correlation judging method.

6. The pixel interpolation method according to claim 5, wherein
the calculating comprises calculating the chroma evaluation value including a first color-difference component evaluation value and a second color-difference component evaluation value,
the pixel interpolation method further comprising:
calculating said first color-difference component evaluation value without using a position of the target pixel in the region formed by the target pixel and neighboring pixels; and
calculating said second color-difference component evaluation value using the position of the target pixel in the region formed by the target pixel and neighboring pixels.

7. A pixel interpolation method implemented in an imaging processing apparatus comprising:
inputting, at the imaging processing apparatus, a pixel signal of a predetermined color space;
calculating, at the imaging processing apparatus, a chroma evaluation value of a region formed by a target pixel and neighboring pixels thereof;
executing, at the imaging processing apparatus, pixel interpolation for color image on said target pixel using a pixel interpolation method for color image;
executing, at the imaging processing apparatus, pixel interpolation for gray image on said target pixel using a pixel interpolation method for gray image;
determining a weighting coefficient based on the chroma evaluation value, the weighting coefficient having a positive correlation with the chroma evaluation value; and
synthesizing, at the imaging processing apparatus and in a proportion based on the determined weighting coefficient, a pixel value obtained by execution of said pixel interpolation for color image and a pixel value obtained by execution of said pixel interpolation for gray image.

8. The pixel interpolation method according to claim 7 further comprising:
executing said pixel interpolation for color image on said target pixel in a correlated direction determined by a correlation judging method for color image using said pixel interpolation method for color image, and
executing said pixel interpolation for gray image on said target pixel in a correlated direction determined by a correlation judging method for gray image using said pixel interpolation method for gray image.

9. The pixel interpolation method according to claim 7 further comprising:
a correlation judging method for color image is selected when said chroma evaluation value is higher than a threshold value, and a correlation judging method for gray image is selected when said chroma evaluation value is not higher than said threshold value,
executing said pixel interpolation for color image on said target pixel in a correlated direction determined by a selected one of said correlation judging methods using said pixel interpolation method for color image, and
executing said pixel interpolation for gray image on said target pixel in a correlated direction determined by a selected one of said correlation judging methods using said pixel interpolation method for gray image.

10. The pixel interpolation method according to claim 7, wherein
the calculating comprises calculating the chroma evaluation value including a first color-difference component evaluation value and a second color-difference component evaluation value,
the pixel interpolation method further comprising:
calculating said first color-difference component evaluation value without using a position of the target pixel in the region formed by the target pixel and neighboring pixels; and
calculating said second color-difference component evaluation value using the position of the target pixel in the region formed by the target pixel and neighboring pixels.

11. A pixel interpolation method implemented in an imaging processing apparatus comprising:
inputting, at the imaging processing apparatus, a pixel signal of a predetermined color space;
calculating, at the imaging processing apparatus, a chroma evaluation value of a region formed by a target pixel and neighboring pixels, the calculating the chroma evaluation value including
calculating a first color-difference component evaluation value from color-difference component values obtained on the basis of each pixel average value per color component using said target pixel and neighboring pixels thereof,
accumulating color-difference component values in a predetermined direction using said target pixel and said neighboring pixels thereof to calculate a second color-difference component evaluation value, and
comparing said first and second color-difference component evaluation values to select one having a lower color-difference component level, as said chroma evaluation value;
selecting, at the imaging processing apparatus, a correlation judging method and a pixel interpolation method on the basis of said chroma evaluation value; and
executing, at the imaging processing apparatus, the pixel interpolation on said target pixel in the correlated direction determined by said selected correlation judging method.

12. The pixel interpolation method according to claim 11, wherein the calculating the chroma evaluation value further comprises:
accumulating color-difference component values in a vertical direction using said neighboring pixels of target pixel to calculate a vertical color-difference component evaluation value;
accumulating color-difference component values in a horizontal direction using said neighboring pixels of said target pixel to calculate a horizontal color-difference component evaluation value; and
comparing said first color-difference component evaluation value, said vertical color-difference component evaluation value and said horizontal color-difference component evaluation value to select one having the lowest color-difference component level, as said chroma evaluation value.

13. An image distinction method implemented in an imaging processing apparatus comprising:
inputting, at the imaging processing apparatus, a pixel signal of a predetermined color space;
calculating, at the imaging processing apparatus, a first color-difference component value from color-difference component values obtained on the basis of each pixel average value per color component using a target pixel and neighboring pixels thereof;
accumulating, at the imaging processing apparatus, color-difference component values in a predetermined direction using said target pixel and said neighboring pixels thereof to calculate a second color-difference component evaluation value;
comparing, at the imaging processing apparatus, said first and second color-difference component evaluation values to select one having a lower color-difference component level, as a chroma value;
judging, at the imaging processing apparatus, whether a region including said target pixel is one of a gray image and a color image using said chroma evaluation value;
accumulating, at the imaging processing apparatus, color-difference component values in a vertical direction using said target pixel and said neighboring pixels thereof to calculate a vertical color-difference component evaluation value;
accumulating, at the imaging processing apparatus, color-difference component values in a horizontal direction using said target pixel and said neighboring pixels thereof to calculate a horizontal color-difference component evaluation value; and
comparing, at the imaging processing apparatus, said first color-difference component evaluation value, said vertical color-difference component evaluation value and said horizontal color-difference component evaluation value to select one having the lowest color-difference component level, as said chroma evaluation value.

14. A computer readable storage medium encoded with instructions, which when executed by a imaging processing apparatus causes the imaging processing apparatus to implement a pixel interpolation method comprising:
inputting, at the imaging processing apparatus, a pixel signal of a predetermined color space;
calculating, at the imaging processing apparatus, a chroma evaluation value of a region formed by a target pixel and neighboring pixels;
selecting, at the imaging processing apparatus, one of a plurality of predetermined correlation judging methods and one of a plurality of predetermined pixel interpolation methods on the basis of said chroma evaluation value; and
determining, by the selected predetermined correlation judging method and at the imaging processing apparatus, a correlated direction;
executing, at the imaging processing apparatus, pixel interpolation according to the selected predetermined pixel interpolation method on said target pixel in the correlated direction determined by said selected predetermined correlation judging method.

15. A computer readable storage medium encoded with instructions, which when executed by a imaging processing apparatus causes the imaging processing apparatus to implement an image distinction method comprising:
inputting, at the imaging processing apparatus, a pixel signal of a predetermined color space;
calculating, at the imaging processing apparatus, a first color-difference component value from color-difference component values obtained on the basis of each pixel average value per color component using a target pixel and neighboring pixels thereof;
accumulating, at the imaging processing apparatus, color-difference component values in a predetermined direction using said target pixel and said neighboring pixels thereof to calculate a second color-difference component evaluation value;

comparing, at the imaging processing apparatus, said first and second color-difference component evaluation values to select one having a lower color-difference component level, as a chroma value;

judging, at the imaging processing apparatus, whether a region including said target pixel is one of a gray image and a color image using said chroma evaluation value;

accumulating, at the imaging processing apparatus, color-difference component values in a vertical direction using said target pixel and said neighboring pixels thereof to calculate a vertical color-difference component evaluation value;

accumulating, at the imaging processing apparatus, color-difference component values in a horizontal direction using said target pixel and said neighboring pixels thereof to calculate a horizontal color-difference component evaluation value; and comparing, at the imaging processing apparatus, said first color-difference component evaluation value, said vertical color-difference component evaluation value and said horizontal color-difference component evaluation value to select one having the lowest color-difference component level, as said chroma evaluation value.

16. A pixel interpolation method implemented in an imaging processing apparatus comprising:

inputting, at the imaging processing apparatus, a pixel signal of a predetermined color space;

calculating, at the imaging processing apparatus, a chroma evaluation value of a region formed by a target pixel and neighboring pixels thereof, the calculating the chroma evaluation value including calculating a first color-difference component evaluation value from color-difference component values obtained on the basis of each pixel average value per color component using said target pixel and neighboring pixels thereof;

accumulating color-difference component values in a predetermined direction using said target pixel and said neighboring pixels thereof to calculate a second color-difference component evaluation value;

comparing said first and second color-difference component evaluation values to select one having a lower color-difference component level, as said chroma evaluation value;

executing, at the imaging processing apparatus, pixel interpolation for color image on said target pixel using a pixel interpolation method for color image;

executing, at the imaging processing apparatus, pixel interpolation for gray image on said target pixel using a pixel interpolation method for gray image; and synthesizing, at the imaging processing apparatus, a pixel value obtained by execution of said pixel interpolation for color image and a pixel value obtained by execution of said pixel interpolation for gray image in a proportion positively correlated with said chroma evaluation value.

17. The pixel interpolation method according to claim 16, wherein the calculating the chroma evaluation value further comprises:

accumulating color-difference component values in a vertical direction using said neighboring pixels of target pixel to calculate a vertical color-difference component evaluation value;

accumulating color-difference component values in a horizontal direction using said neighboring pixels of said target pixel to calculate a horizontal color-difference component evaluation value; and comparing said first color-difference component evaluation value, said vertical color-difference component evaluation value and said horizontal color-difference component evaluation value to select one having the lowest color-difference component level, as said chroma evaluation value.

\* \* \* \* \*